United States Patent
Ramalingam et al.

(10) Patent No.: US 10,178,082 B2
(45) Date of Patent: Jan. 8, 2019

(54) BOOTSTRAPPING AUTHENTICATION OF SECOND APPLICATION VIA CONFIRMATION BY FIRST APPLICATION

(71) Applicant: Amazon Technologies, Inc., Seattle, WA (US)

(72) Inventors: Harsha Ramalingam, Kirkland, WA (US); Jesper Mikael Johansson, Redmond, WA (US); Bharath Kumar Bhimanaik, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/631,329

(22) Filed: Jun. 23, 2017

(65) Prior Publication Data

US 2017/0289136 A1    Oct. 5, 2017

Related U.S. Application Data

(62) Division of application No. 14/228,644, filed on Mar. 28, 2014, now Pat. No. 9,710,640.

(51) Int. Cl.
| | |
|---|---|
| *G06F 21/42* | (2013.01) |
| *H04L 29/06* | (2006.01) |
| *G06F 21/44* | (2013.01) |
| *G06F 9/4401* | (2018.01) |
| *G06F 21/57* | (2013.01) |

(52) U.S. Cl.
CPC ........ *H04L 63/0815* (2013.01); *G06F 9/4406* (2013.01); *G06F 21/42* (2013.01); *G06F 21/445* (2013.01); *G06F 21/575* (2013.01); *H04L 63/083* (2013.01); *H04L 63/18* (2013.01); *H04L 63/08* (2013.01); *H04L 63/10* (2013.01); *H04L 63/105* (2013.01)

(58) Field of Classification Search
CPC .................................................. H04L 63/0815
See application file for complete search history.

(56) References Cited

U.S. PATENT DOCUMENTS

| | | | |
|---|---|---|---|
| 7,076,797 B2 | 7/2006 | Loveland | |
| 7,895,644 B1 * | 2/2011 | Thakur | G06F 21/41 709/229 |

(Continued)

OTHER PUBLICATIONS

"Authentication between multiple systems/platforms within the same web application context", Jan. 25, 2012, retrieved online from <https://web.archive.org/web/20120125193545/https://security.stackexchange.com/questions/7075/authentication-between-multiple-systems-platforms-within-the-same-web-applicatio>, retrieved on Feb. 22, 2018.*

(Continued)

*Primary Examiner* — Lisa C Lewis
*Assistant Examiner* — Zhimei Zhu
(74) *Attorney, Agent, or Firm* — Thomas | Horstemeyer, LLP

(57) ABSTRACT

Disclosed are various embodiments that facilitate bootstrap authentication of a second application by way of a user confirmation via a first application. The first application is authenticated using trusted credentials. A first application is authenticated with an authentication service using the security credential. Text input is sent from the first application to the second application via the network. The text input is sent to a text entry field on the second application.

20 Claims, 17 Drawing Sheets

(56) References Cited

U.S. PATENT DOCUMENTS

| | | | |
|---|---|---|---|
| 8,625,796 | B1 | 1/2014 | Ayed |
| 8,627,438 | B1 | 1/2014 | Bhimanaik |
| 8,925,052 | B2 | 12/2014 | Deagon |
| 8,966,594 | B2 | 2/2015 | Schneider |
| 9,001,977 | B1 | 4/2015 | Ramalingam et al. |
| 9,397,989 | B1 | 7/2016 | Ramalingam et al. |
| 2004/0128393 | A1 | 7/2004 | Blakley, III et al. |
| 2006/0269061 | A1 | 11/2006 | Balasubramanian et al. |
| 2007/0143392 | A1* | 6/2007 | Choe .................. G06F 21/57 709/203 |
| 2008/0046983 | A1 | 2/2008 | Lester et al. |
| 2008/0168539 | A1 | 7/2008 | Stein |
| 2009/0064295 | A1* | 3/2009 | Budampati ........... H04W 12/04 726/6 |
| 2012/0204245 | A1 | 8/2012 | Ting et al. |
| 2012/0291114 | A1 | 11/2012 | Poliashenko et al. |
| 2013/0031261 | A1* | 1/2013 | Suggs .................. H04L 63/083 709/228 |
| 2013/0073625 | A1* | 3/2013 | Umetsu .............. G06Q 10/1095 709/204 |
| 2013/0219479 | A1* | 8/2013 | DeSoto ................. H04W 12/06 726/6 |
| 2013/0333006 | A1 | 12/2013 | Tapling et al. |
| 2013/0333008 | A1 | 12/2013 | Tapling et al. |
| 2014/0033292 | A1 | 1/2014 | Moore et al. |
| 2014/0082703 | A1* | 3/2014 | Zhang .................... H04L 63/08 726/4 |
| 2014/0160033 | A1* | 6/2014 | Brikman ............. G06F 3/04845 345/173 |
| 2014/0173695 | A1 | 6/2014 | Valdivia |
| 2014/0189841 | A1 | 7/2014 | Metke et al. |
| 2014/0208095 | A1* | 7/2014 | Stuntebeck ............ H04L 63/06 713/152 |
| 2014/0208400 | A1 | 7/2014 | Henshaw et al. |
| 2014/0281495 | A1 | 9/2014 | Um et al. |
| 2015/0052067 | A1 | 2/2015 | Thiyagarajan et al. |
| 2015/0156198 | A1 | 6/2015 | Sabin et al. |
| 2015/0271164 | A1 | 9/2015 | Hamid |
| 2016/0036809 | A1 | 2/2016 | Bhimanaik |
| 2016/0294842 | A1 | 10/2016 | Ramalingam et al. |

OTHER PUBLICATIONS

Vizio VBR21 0 User Manual [p. 23]: Chapter 5 Using Netflix, http://www.manualslib.com/manuai/187602Nizio-Vbr210.html?page=23, retrieved on Apr. 3, 2014.

Michael Arcand, "How to Start Streaming Movies with Netflix", http://www.nbcnews.com/id/42766316/ns/technology_and_science-digital_home/t/how-start-streaming-movies-netflix/#.UysEV_IdVul, updated Apr. 26, 2011.

U.S. Appl. No. 14/288,644, filed Mar. 28, 2014, Notice of Allowance Office Action dated Mar. 17, 2017.

U.S. Appl. No. 14/228,644, filed Mar. 28, 2014, Patent Board of Appeals Decision mailed on Feb. 15, 2017.

U.S. Appl. No. 14/228,644, filed Mar. 28, 2014, Final Office Action dated Sep. 22, 2016.

U.S. Appl. No. 14/228,644, filed Mar. 28, 2014, Response to Non-Final Office Action dated Apr. 5, 2016.

U.S. Appl. No. 14/228,644, filed Mar. 28, 2014, Non-Final Office Action dated Apr. 5, 2016.

U.S. Appl. No. 14/228,644, filed Mar. 28, 2014, Response to Final Office Action dated Oct. 19, 2015.

U.S. Appl. No. 14/228,644, filed Mar. 28, 2014, Final Office Action dated Oct. 19, 2015.

U.S. Appl. No. 14/228,644, filed Mar. 28, 2014, Response to Non-Final Office Action dated May 7, 2015.

U.S. Appl. No. 14/228,644, filed Mar. 28, 2014, Non-Final Office Action dated May 7, 2015.

U.S. Appl. No. 14/228,635, filed Mar. 28, 2014, Notice of Allowance dated Nov. 4, 2016.

U.S. Appl. No. 14/228,635, filed Mar. 28, 2014, Response to Restriction/Election dated Jun. 3, 2016.

U.S. Appl. No. 14/228,635, filed Mar. 28, 2014, Restriction/Election dated Jun. 3, 2016.

U.S. Appl. No. 15/423,980, filed Feb. 3, 2017, Response to Non-Final Office Action dated Mar. 24, 2017.

U.S. Appl. No. 15/423,980, filed Feb. 3, 2017, Non-Final Office Action dated Mar. 24, 2017.

* cited by examiner

BOOTSTRAPPING AUTHENTICATION OF SECOND APPLICATION VIA CONFIRMATION BY FIRST APPLICATION

CROSS-REFERENCE TO RELATED APPLICATION

This application is a divisional of, claims the benefit of, and priority to U.S. patent application Ser. No. 14/228,644, entitled "BOOTSTRAPPING AUTHENTICATION OF SECOND APPLICATION VIA CONFIRMATION BY FIRST APPLICATION," filed on Mar. 28, 2014, which is incorporated by reference herein in its entirety.

BACKGROUND

Users typically are authenticated to a networked application by providing a correct combination of a username and a password. Passwords are capable of providing adequate security for user authentication. Unfortunately, when users are permitted to set their passwords, the human element may result in passwords that are easily guessed or are susceptible to brute-force attack. This is because users will often select dictionary words and/or short passwords that are easy to remember and quick to enter.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
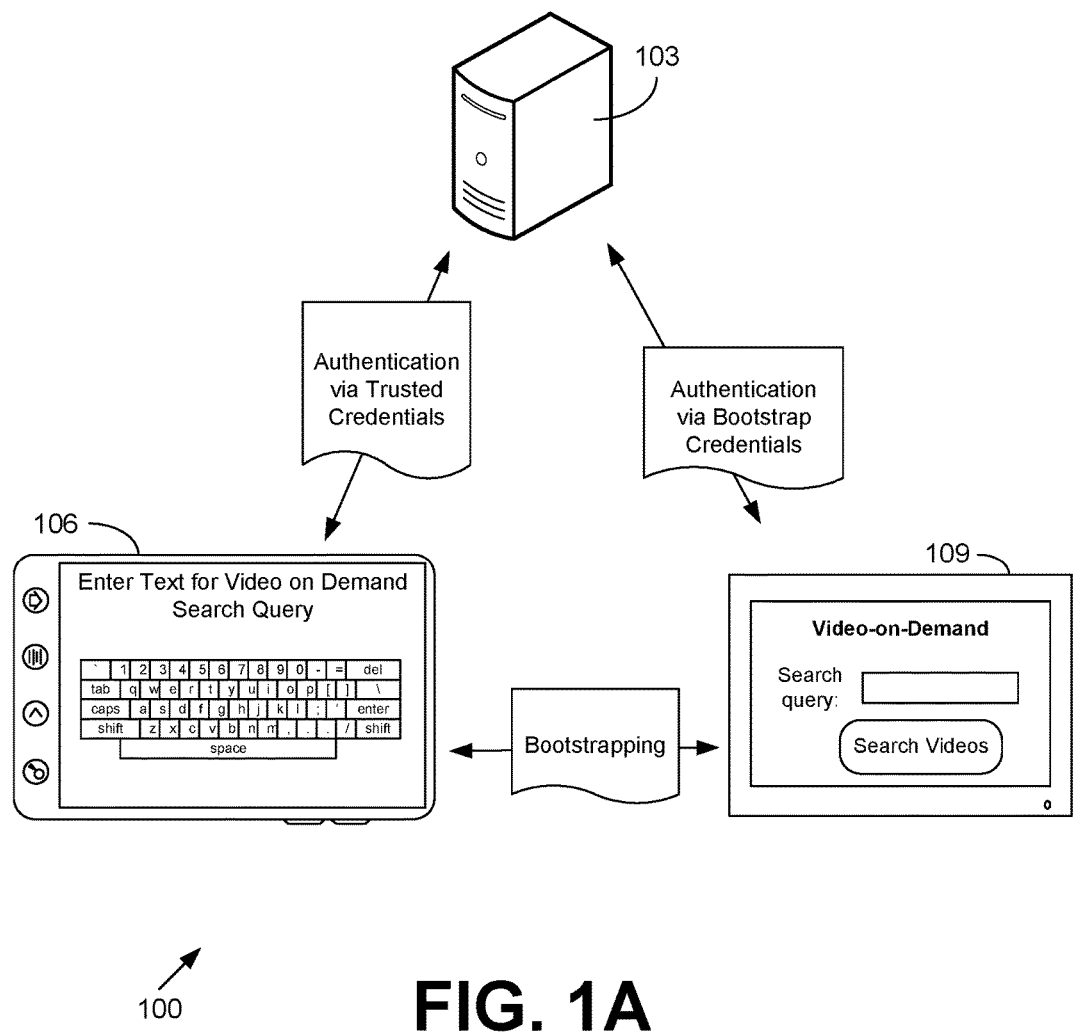
FIGS. 1A-1B are drawings of example scenarios within a networked environment according to various embodiments of the present disclosure.

The present disclosure relates to bootstrapping user authentication across multiple applications and/or multiple devices. Entering passwords or other security credentials may be regarded as a burdensome hassle for users. After a user enters a username and password combination once for a particular service, the user may regard entering the same username and password again as unnecessarily burdensome. This can apply in the context of multiple devices and/or multiple applications. For example, a user may be authenticated via a first application on desktop computer. The user experience may be diminished if the user has to re-enter the same security credentials for a second application on the same desktop computer, or if the user has to re-enter the same security credentials on an application on a smartphone or other device.

Various embodiments of the present disclosure allow a user to apply or transfer an existing authentication to another application or device, without the user having to enter his or her security credentials multiple times. Instead, the user may receive a token via an application through which he or she is already authenticated. The user may then apply this token to another application on the same device, or to an application on another device.

This "bootstrapping" of authentication may be particularly helpful in a use case involving a device with limited data entry capabilities. For example, for data entry, a television or set-top box may ordinarily employ an on-screen keyboard controlled by arrow buttons on a remote control. Manipulating such an on-screen keyboard may be time consuming and inconvenient to the user. By bootstrapping authentication of the television or set-top box using a previously authenticated mobile device, the user thereby avoids repetitively entering his or her username and password via the on-screen keyboard. Moreover, an application session of the mobile device may be tied to the television or set-top box so as to facilitate data entry by a more convenient mechanism employing the mobile device.

In another use case, a user may employ two different applications upon a single device that each use the same account and security credentials. Entering the same credentials for both would be repetitive. Furthermore, it may be important to associate the sessions corresponding to the two applications.

As a non-limiting example, a customer service representative may use two separate applications simultaneously: a customer service management application and a video telephony application. Such a situation may employ approaches to customer support disclosed by U.S. patent application Ser. No. 13/966,007 entitled "REMOTE SUPPORT OF COMPUTING DEVICES" and filed on Aug. 13, 2013, which is incorporated herein by reference in its entirety. The representative may access customer information, troubleshooting guides, record incident reports, etc., via the customer service management application. Meanwhile, the representative may communicate with the customer using the video telephony application. The customer service management application may necessitate the use of a virtual private network for security purposes and to ensure that a system health check has been performed. However, because of the isochronous nature of the video telephony communication, it may be undesirable to route data for the video telephony application via the virtual private network. For example, the virtual private network may suffer from delays imposed by automatic repeat request (ARQ) protocols that provide reliability, such as transmission control protocol (TCP) and other protocols.

Thus, data for the video telephony application may be routed instead over user datagram protocol (UDP), real-time transport protocol (RTP), and/or other protocols. In order to relate corresponding sessions of the video telephony application and the customer service management application, embodiments of the present disclosure may be employed. Accordingly, the authentication and system health checks performed for the session of the customer service management application may be associated with the session of the video telephony application by providing a bootstrapping authentication token via an interface of the video telephony application.

It is noted that in the foregoing example, both applications may be executed by a single device or by multiple devices. Various approaches to bootstrapping user authentication are described in U.S. patent application Ser. No. 13/934,848 entitled "BOOTSTRAPPING USER AUTHENTICATION ON DEVICES" and filed on Jul. 3, 2013, which is incorporated herein by reference in its entirety. Additional techniques that may be relevant to bootstrapping authentication may be found in U.S. Pat. No. 8,627,438 entitled "PASSWORDLESS STRONG AUTHENTICATION USING TRUSTED DEVICES" and issued on Jan. 7, 2014, U.S. patent application Ser. No. 13/546,626 entitled "TRUSTWORTHY INDICATION OF SOFTWARE INTEGRITY" and filed on Jul. 11, 2012, U.S. patent application Ser. No. 13/682,596 entitled "Telephone-based User Authentication" and filed on Nov. 20, 2012, and U.S. patent application Ser. No. 13/746,719 entitled "SCALABLE ACCOUNT STATUS MANAGEMENT" and filed on Jan. 22, 2013, all of which are incorporated herein by reference in their entireties.

With reference to FIG. 1A, shown is an example scenario within a networked environment 100, including a computing environment 103 in data communication with a primary client 106 and a bootstrap client 109 according to various embodiments. In this non-limiting example, the primary client 106 corresponds to a handheld mobile device (e.g., a tablet, a smartphone, etc.), while the bootstrap client 109 corresponds to a relatively large digital television. A user logs into a user account maintained in the computing environment 103 using the primary client 106. In doing so, the user provides one or more trusted credentials to the primary client 106, which may include passwords, keys, and/or other credentials. For example, it may be assumed that the primary client 106 includes adequate visual cues within a user interface so as to assure the user that the trusted credentials are being provided to the correct application or network page.

The user may wish to access the same account via the bootstrap client 109. However, data entry via the bootstrap client 109 may be unwieldy or inconvenient, e.g., via an on-screen keyboard controlled by arrow keys on a remote control. In order to authenticate, the bootstrap client 109 "bootstraps" the authentication via a primary client 106 that may already be authenticated by the computing environment 103. To this end, the primary client 106 that has been authenticated sends a bootstrap request to the computing environment 103. The computing environment 103 generates a bootstrap credential, which is returned to the primary client 106.

The bootstrap credential is then communicated from the primary client 106 to the bootstrap client 109, which may involve an automated process or a manual process. For instance, the primary client 106 may display the bootstrap credential to the user, who may then enter the bootstrap credential via a user interface field rendered upon a display of the bootstrap client 109. In such a case, the bootstrap credential may be generated in order to be relatively easy to remember and/or relatively easy to enter via the bootstrap client 109. In other words, the bootstrap credential may itself be a weaker credential than the trusted credential(s). For example, the bootstrap credential may be a dictionary word, a four-digit code, an action to be performed by a user, etc. Alternatively, the primary client 106 may communicate the bootstrap credential to the bootstrap client 109 via a wireless data connection using near-field communication (NFC), Bluetooth®, Wi-Fi®, etc. The bootstrap client 109 then may authenticate with the computing environment 103 using the bootstrap credential in order to access the user account.

Figure 1B:
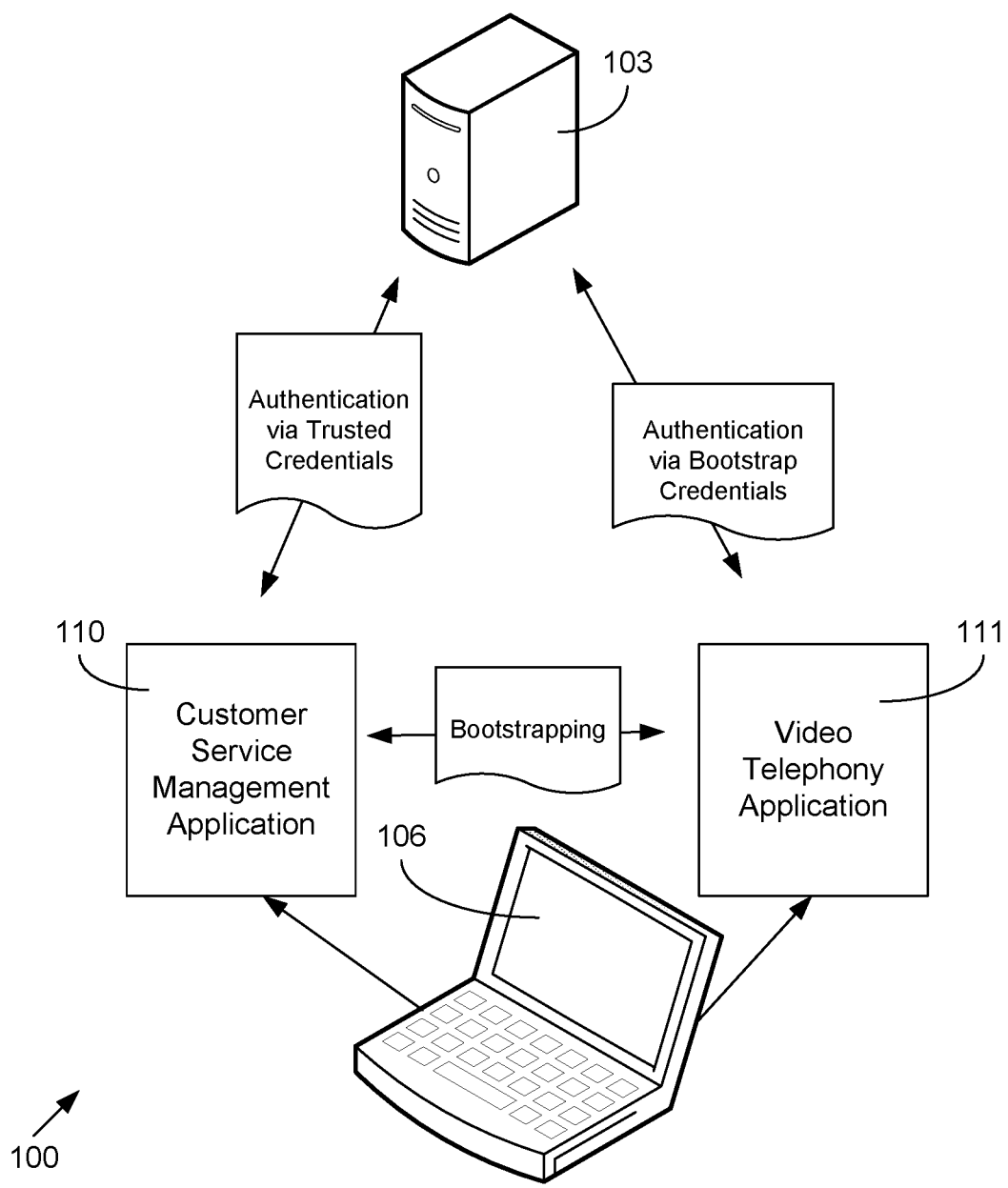

Moving on to FIG. 1B, shown is another example scenario within a networked environment 100, including a computing environment 103 in data communication with a primary client 106 according to various embodiments. As compared with FIG. 1A, FIG. 1B involves a single client 106 with multiple applications: a primary application 110 (here corresponding to a customer service management application) and a bootstrap application 111 (here corresponding to a video telephony application).

A user logs into a user account maintained in the computing environment 103 using the client 106 and the primary application 110. In doing so, the user provides one or more trusted credentials to the client 106 via the primary application 110, which may include passwords, keys, and/or other credentials. A network data session may then be established. The user may wish to access the same account and/or network data session via the bootstrap application 111. In order to authenticate, the bootstrap application 111 "bootstraps" the authentication via the primary application 110 that may already be authenticated by the computing environment 103. To this end, the primary application 110 that has been authenticated sends a bootstrap request to the computing environment 103. The computing environment 103 generates a bootstrap credential, which is returned to the primary application 110.

The bootstrap credential is then communicated from the primary application 110 to the bootstrap application 111, which may involve an automated process or a manual process. For instance, the primary application 110 may display the bootstrap credential to the user, who may then enter the bootstrap credential via a user interface field rendered upon a display of the client 106 by the bootstrap application 111. Alternatively, the primary application 110 may communicate the bootstrap credential to the bootstrap application 111 via inter-process communication or another approach. The bootstrap application 111 then may authenticate with the computing environment 103 using the bootstrap credential in order to access the user account and/or the network data session of the primary application 110. In the following discussion, a general description of the system and its components is provided, followed by a discussion of the operation of the same.

Figure 2:
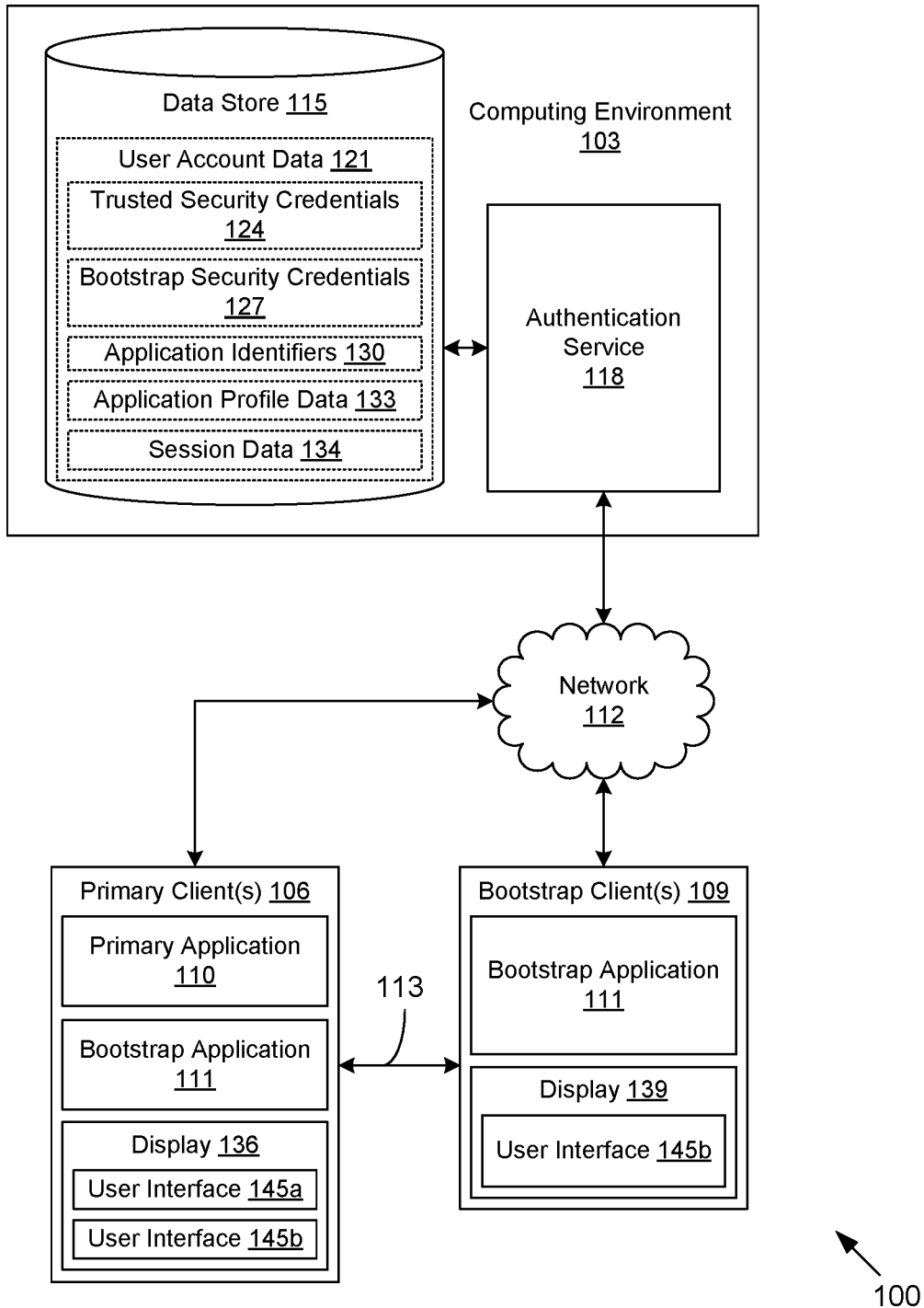
FIG. 2 is a block diagram showing a networked environment according to various embodiments of the present disclosure.

Referring next to FIG. 2, shown is a block diagram of a networked environment 100 according to various embodiments. The networked environment 100 includes a computing environment 103, one or more primary clients 106, and one or more bootstrap clients 109 in data communication via a network 112. The network 112 includes, for example, the Internet, intranets, extranets, wide area networks (WANs), local area networks (LANs), personal area networks (PANs), wired networks, wireless networks, or other suitable networks, etc., or any combination of two or more such networks. Additionally, the bootstrap client 109 may be in data communication with the primary client 106 via a local network channel 113 separate from the network 112, e.g., NFC, Bluetooth®, infrared, and/or other technologies.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a hosted or "cloud" computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include an authentication service 118 and other applications, services, processes, systems, engines, or functionality not discussed in detail herein. The authentication service 118 is executed to authenticate users at the primary clients 106 and bootstrap clients 109 for access to user accounts. In some embodiments, the authentication service 118 may serve up network pages that include user interfaces for logging onto user accounts and requesting bootstrap credentials. In other embodiments, the authentication service 118 may communicate with applications executed by the primary clients 106 and/or bootstrap clients 109 by way of an application programming interface (API). The authentication service 118 may correspond to an independent or federated identity provider and/or may facilitate a single sign-on experience for multiple different systems, services, etc., operated by one or more organizations.

The data stored in the data store 115 includes, for example, user account data 121 and potentially other data. The user account data 121 corresponds to data regarding user accounts for multiple users. The user account data 121 may include, for example, trusted security credentials 124, bootstrap security credentials 127, application identifiers 130, application profile data 133, session data 134, and/or other data. The trusted security credentials 124 may correspond to usernames, passwords, keys, answers to knowledge-based questions, social security numbers, and/or other private information. In some cases, the trusted security credentials 124 may correspond to long-lived security credentials. Such credentials may be expected to persist for at least a predetermined length of time or indefinitely. For instance, the trusted security credentials 124 may be assumed to be valid until the user changes them. Alternatively, the trusted security credentials 124 may be valid for a month, six months, or another period of time according to a predefined security policy.

The bootstrap security credentials 127 correspond to security credentials of an ephemeral nature that are used to authenticate bootstrap clients 109 and/or bootstrap applications 111. For example, the bootstrap security credentials 127 may include a one-time password, a personal identification number, a token, or other types of credentials. The bootstrap security credentials 127 may be relatively less trusted than the trusted security credentials 124. For example, the trusted security credentials 124 may be user-defined passwords that are intended to be long lived, while the bootstrap security credentials 127 may be automatically generated numerical codes or dictionary words that are valid for a relatively shorter period of time. The bootstrap security credentials 127 may be relatively less trusted because they may be selected for ease of memorization rather than credential strength. The bootstrap security credentials 127 may be valid for a predetermined length of time (e.g., an hour, a day, etc.) and/or may expire in response to certain events. Non-limiting examples of events that may trigger expiration may include a change to a bootstrap application 111 or other applications executed in the bootstrap client 109, a detected physical or network location of the bootstrap client 109, different bootstrap clients 109 and/or bootstrap applications 111 using the same bootstrap security credential 127, a change in a network address of the bootstrap client 109, and/or other events. The bootstrap security credentials 127 may be generated for specific bootstrap clients 109 and/or instances of bootstrap applications 111 and may be invalid for use by other bootstrap clients 109 and/or bootstrap applications 111.

The application identifiers 130 may include unique device identifiers, unique software identifiers, network addresses, media access control (MAC) addresses, serial numbers, and/or other types of identifiers for bootstrap clients 109 and/or bootstrap applications 111. The application identifiers 130 may be employed in order to generate bootstrap security credentials 127. A bootstrap security credential 127 may be tied to a particular application identifier 130 so that it is valid only for a particular bootstrap client 109 and/or instance of a bootstrap application 111.

The application profile data 133 may describe or profile applications installed upon the bootstrap clients 109 in order to facilitate detecting a change in such applications. For example, it may be desired to expire access to a user account via a bootstrap security credential 127 when the content of an application that accesses the user account changes. The session data 134 may include various state information relating to network data sessions between the primary client 106 and the computing environment 103 and/or between the bootstrap client 109 and the computing environment 103. The network data sessions may correspond to application sessions, TCP sessions, RTP sessions, and/or other sessions.

The primary client 106 and the bootstrap client 109 are representative of a plurality of client devices that may be coupled to the network 112. The primary clients 106 and the bootstrap clients 109 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. In one example, the primary client 106 may be a desktop device, and the bootstrap client 109 may be a mobile device. The primary client 106 may include a display 136, and the bootstrap client 109 may include a display 139. The displays 136, 139 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The primary client 106 may be configured to execute various applications such as a primary application 110 and/or other applications. The primary application 110 may be executed in a primary client 106, for example, to access network content served up by the computing environment 103 and/or other servers, thereby rendering a user interface 145a on the display 136. The primary application 110 may, for example, correspond to a browser, a mobile application, etc., and the user interface 145 may correspond to a network page, a mobile application screen, etc.

In some embodiments, the primary client 106 may be configured to execute a bootstrap application 111. The bootstrap application 111 may be executed in a primary client 106, for example, to access network content served up by the computing environment 103 and/or other servers, thereby rendering a user interface 145b on the display 136. The bootstrap application 111 may, for example, correspond to a browser, a mobile application, etc., and the user interface 145b may correspond to a network page, a mobile application screen, etc. The primary client 106 may be configured to execute applications beyond the primary application 110 and the bootstrap application 111 such as, for example, browsers, mobile applications, email applications, social networking applications, and/or other applications.

The bootstrap client 109 may be configured to execute various applications such as a bootstrap application 111 and/or other applications. The bootstrap application 111 may be executed in a bootstrap client 109, for example, to access network content served up by the computing environment 103 and/or other servers, thereby rendering a user interface 145b on the display 139. The bootstrap application 111 may, for example, correspond to a browser, a mobile application, etc., and the user interface 151 may correspond to a network page, a mobile application screen, etc. The bootstrap client 109 may be configured to execute applications beyond the bootstrap application 111 such as, for example, browsers, mobile applications, email applications, social networking applications, and/or other applications.

Next, a general description of the operation of the various components of the networked environment 100 is provided. To begin, a user employs a primary client 106 to authenticate using trusted security credentials 124 for access to resources associated with a user account. For example, the user provides a username and password to the authentication service 118 by filling out a form in a network page. The user is reassured that the network page is legitimate due to browser chrome and/or other visual cues.

Subsequently, the user may wish to gain access via a mobile device or other bootstrap client 109. Unlike the primary client 106, the bootstrap client 109 may be more susceptible to phishing attacks due to the control given to developers over the user interface 151, the lack of browser chrome, and/or other factors. It may be the case that an attacker could completely fake a user interface 151 on the bootstrap client 109. These issues may weigh against providing trusted security credentials 124 via the bootstrap clients 109.

To provide access to the bootstrap client 109, a bootstrap security credential 127 is requested via the primary client 106 that has already been authenticated. The bootstrap security credential 127 is thus generated and returned to the primary client 106. The primary client 106 communicates the bootstrap security credential 127 to the bootstrap client 109 via manual user entry, quick response (QR) or other machine-readable code, wireless data transmission, or other approaches. The bootstrap client 109 is thereby able to authenticate with the authentication service 118 for access to the user account with the bootstrap security credential 127. It is noted that the trusted security credentials 124 need not be provided by the bootstrap client 109 in order to authenticate.

Application identifiers 130 may be used in order to prevent usage of a bootstrap security credential 127 by non-authorized devices. For example, an application identifier 130 may be generated by a bootstrap client 109, communicated to the primary client 106, and onto the authentication service 118. The bootstrap security credential 127 may be generated based at least in part on the application identifier 130 and/or otherwise associated with the application identifiers 130 such that bootstrap clients 109 lacking access to the application identifier 130 are unable to authenticate using the bootstrap security credential 127. Public-key encryption utilizing the application identifiers 130 may be used for signing the bootstrap security credential 127 or performing other functions for verification of the bootstrap clients 109.

In some scenarios, multiple bootstrap clients 109 may be authenticated via a single bootstrap security credential 127. In one use case, a person giving a presentation may distribute the bootstrap security credential 127 to multiple users, who may then use the bootstrap security credential 127 separately via their own instances of a bootstrap application 111 (in connection with a unique application identifier 130) in order to complete bootstrap authentication in order to receive presentation materials via an online storage account.

In contrast to the trusted security credentials 124, the bootstrap security credentials 127 may be short lived or temporary. For example, authenticated sessions using the bootstrap security credentials 127 may expire after 30 minutes. By contrast, authenticated sessions using the trusted security credentials 124 may last longer or even indefinitely. This difference may ensure close proximity between the primary client 106 and the bootstrap client 109. In one embodiment, the bootstrap security credentials 127 may expire or have limited use based at least in part on the location of the bootstrap clients 109. For example, if the bootstrap security credentials 127 are initially requested for use at a certain location, the bootstrap security credentials 127 may be unusable more than a half mile from that location.

Such functionality may be especially useful in the context of stationary devices such as televisions, which may be expected to remain in the same location for a relatively long period of time. For example, if a television is moved, it may be the case that it was sold, which may be a good reason to expire the bootstrap security credentials 127. Subsequent bootstrapping may be necessary to continue authenticated account access for the bootstrap client 109. Otherwise, access to the user account by the bootstrap client 109 may be disabled. Alternatively, the user of the bootstrap client 109 may be prompted to confirm whether the authentication period should be renewed or revoked prior to a tentative expiration of the access granted in the authentication period.

As client applications request additional or different security privileges, subsequent bootstrapping may be necessary. Further, the code underlying the bootstrap application 111 may change, and this may prompt subsequent bootstrapping. For example, a web application may be self-updating, and the updated code may not correspond to stored application profile data 133. In response to such changes to applications, the bootstrap client 109 may need to be bootstrapped again.

In one embodiment, a bootstrap client 109, once authenticated, may be employed to bootstrap the authentication of other bootstrap clients 109 in like manner. For example, once a user's smartphone is authenticated via bootstrapping, the smartphone may then be considered a trusted device. Subsequently, the user may use the smartphone to bootstrap the authentication of a tablet.

In one embodiment, the primary application 110 may be configured to bootstrap any bootstrap client 109 connected to the primary client 106 via a private or trusted network 112 (FIG. 2), e.g., a home Wi-Fi network 112. Such bootstrapping may be done automatically or subject to user approval of the particular bootstrap client 109 via the primary application 110. A network 112 may be considered "trusted," for example, when the devices connected to the network 112 are in close proximity to the user such as with a home network 112.

In some scenarios, different classes of resources may be made available to clients depending on how they are authenticated. For example, a primary client 106 authenticated with trusted security credentials 124 may be given a higher level of access to resources of a user account as compared to a bootstrap client 109. Further, the method used to bootstrap a bootstrap client 109 may also impact which classes of resources are made available. For example, manual bootstrapping via manual code entry may be considered more trustworthy than automatic bootstrapping via a private wireless network 112. Similarly, automatic bootstrapping with a manual approval process may be considered more trustworthy than purely automatic bootstrapping.

Subsequent to bootstrapping, the primary client 106 may be used to provide data entry for the bootstrap client 109, and/or vice versa. For example, a user may type text via a keyboard into a primary application 110, and that text may be used to supply data for use by the bootstrap application 111 executed on the bootstrap client 109. The text may be communicated by the primary application 110 via the network 112 to the computing environment 103, where it is used to update state in the session data 134. In some cases, the text may be communicated back from the computing environment 103 to the bootstrap application 111 executed upon the bootstrap client 109. Alternatively, the text may be communicated directly between the primary client 106 and the bootstrap client 109.

In some embodiments, once the bootstrap application 111 is authenticated, the respective network data sessions of the primary application 110 and the bootstrap application 111 may be associated with one another in the session data 134 to form a single logical session with the computing environment 103. As a consequence, data from one application may be selectively routed via another application. For example, suppose that the primary client 106 is a laptop connected to the network 112 via a cable modem connection, and the bootstrap client 109 is a smartphone connected to the network via a long-term evolution (LTE) data connection. If the cable modem connection becomes unavailable or saturated, the primary application 110 may instead route its data to the computing environment 103 via the connection of the bootstrap application 111. This may assume a separate connectivity between the primary application 110 and the bootstrap application 111 using, e.g., inter-process communication, Bluetooth®, WiFi®, etc.

The primary application 110 and/or the bootstrap application 111 may also access additional bandwidth via neighboring wireless access points. Such neighboring wireless access points may have network connectivity via another provider, thereby facilitating greater network bandwidth. Various approaches for obtaining additional bandwidth via neighboring wireless access points are described by U.S. patent application Ser. No. 14/094,633, entitled "COOPERATIVE NETWORK ACCESS," and filed on Dec. 2, 2013, which is incorporated herein by reference in its entirety.

In some embodiments, a simplified logout procedure may be provided via the primary application 110. For example, a user may initiate a logout request via the primary application 110. In response to the logout request, the authentication service 118 may be configured to expire the session corresponding to the primary application 110 as well as any other sessions corresponding to bootstrap applications 111 that were bootstrapped via the primary application 110. In some cases, such as logout procedure may be initiated via a bootstrap application 111 that has been authenticated.

The principles of the present disclosure may apply where the primary application 110 and the bootstrap application 111 are executed in separate devices as well as where the primary application 110 and the bootstrap application 111 are executed in the same device.

Figure 3A:
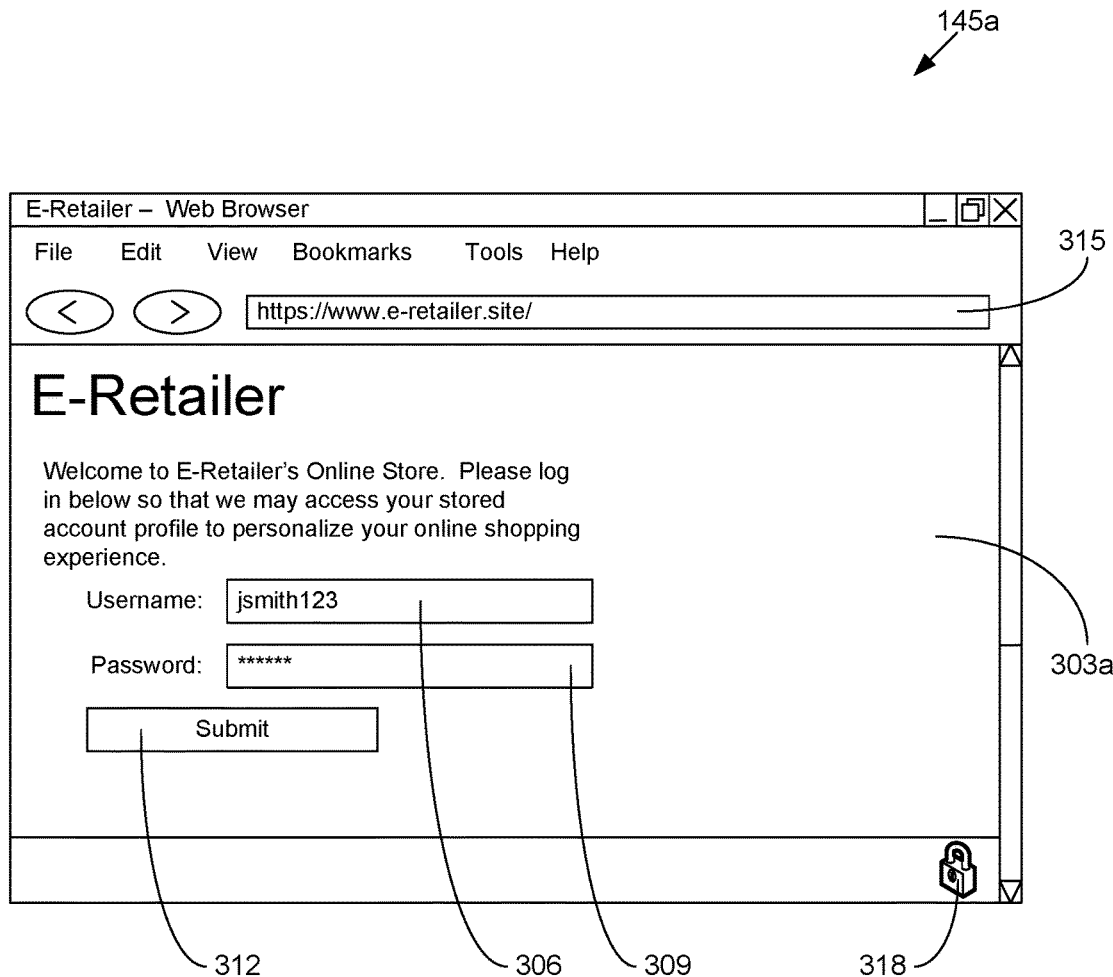
FIGS. 3A-3C are drawings of example user interfaces rendered by a primary application in the networked environment of FIG. 2 according to various embodiments of the present disclosure.

Referring next to FIG. 3A, shown is one example of a user interface 145a rendered by a primary application 110 (FIG. 2) executed in a primary client 106 (FIG. 2) in the networked environment 100 (FIG. 2) according to one embodiment. Specifically, the primary application 110 is a browser that is rendering a network page 303a served up by the computing environment 103 (FIG. 2). The network page 303a facilitates authentication with the authentication service 118 (FIG. 2) in order to access resources associated with a user account of an online retailer. A username field 306 is provided in order for the user to enter a username, a password field 309 is provided in order for the user to enter a password, and a submit component 312 is provided to submit the username and password to the authentication service 118 via the network 112 (FIG. 2).

In this example, the user has filled in username "jsmith123" in the username field 306 and a password in the password field 309. The username and password correspond to trusted security credentials 124 (FIG. 2) of the user account. In some scenarios, the username and password may be stored in the primary client 106 and automatically populated. Alternatively, a cookie may be stored in the primary client 106 that facilitates automatic login. Biometric data, private keys, answers to knowledge-based questions, and so on may be used in addition to or in place of username and password in some embodiments.

Various elements of browser chrome are present in the user interface 145a to reassure the user that the network page 303a corresponds to a legitimate site. To this end, an address bar 315 may show the uniform resource locator (URL) corresponding to the site and a lock icon 318 may indicate the use of secure sockets layer (SSL) or another form of encryption. Window framing, scroll bars, menu bars, taskbars, and so on may also be present to assure the user that the user interface 145a was indeed generated by the browser. Thus, the user may confidently supply the trusted security credentials 124.

Figure 3B:
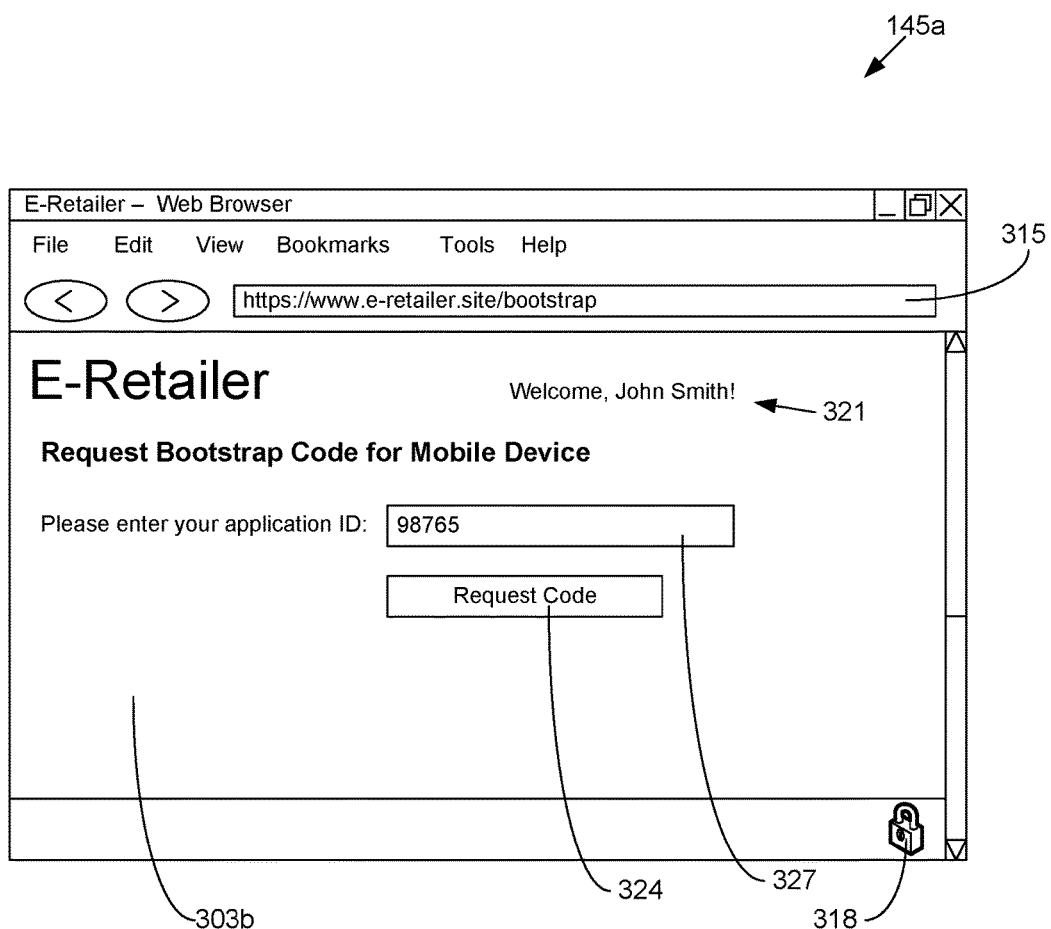

Turning now to FIG. 3B, shown is another example of a user interface 145a rendered by a primary application 110 (FIG. 2) executed in a primary client 106 (FIG. 2) in the networked environment 100 (FIG. 2) according to one embodiment. Specifically, the primary application 110 is a browser that is rendering a network page 303b served up by the computing environment 103 (FIG. 2). The network page 303b facilitates requesting bootstrap security credentials 127 (FIG. 2) from the authentication service 118 (FIG. 2). The network page 303b indicates at label 321 that the user account for "John Smith" has been successfully authenticated.

A request component 324 is provided in order to submit a request for a bootstrap security credential 127. In this example, an application identifier field 327 is provided in order for the user to specify a particular application identifier 130 (FIG. 2) for which the bootstrap security credential 127 is to be generated. In this case, the user has entered the application identifier 130 of "98765." In other examples, it may be that no application identifier 130 is necessary. In some cases, no explicit request for the bootstrap security credentials 127 may be necessary. For example, the bootstrap security credentials 127 may be automatically downloaded to, or preexisting in, the primary client 106.

Figure 3C:
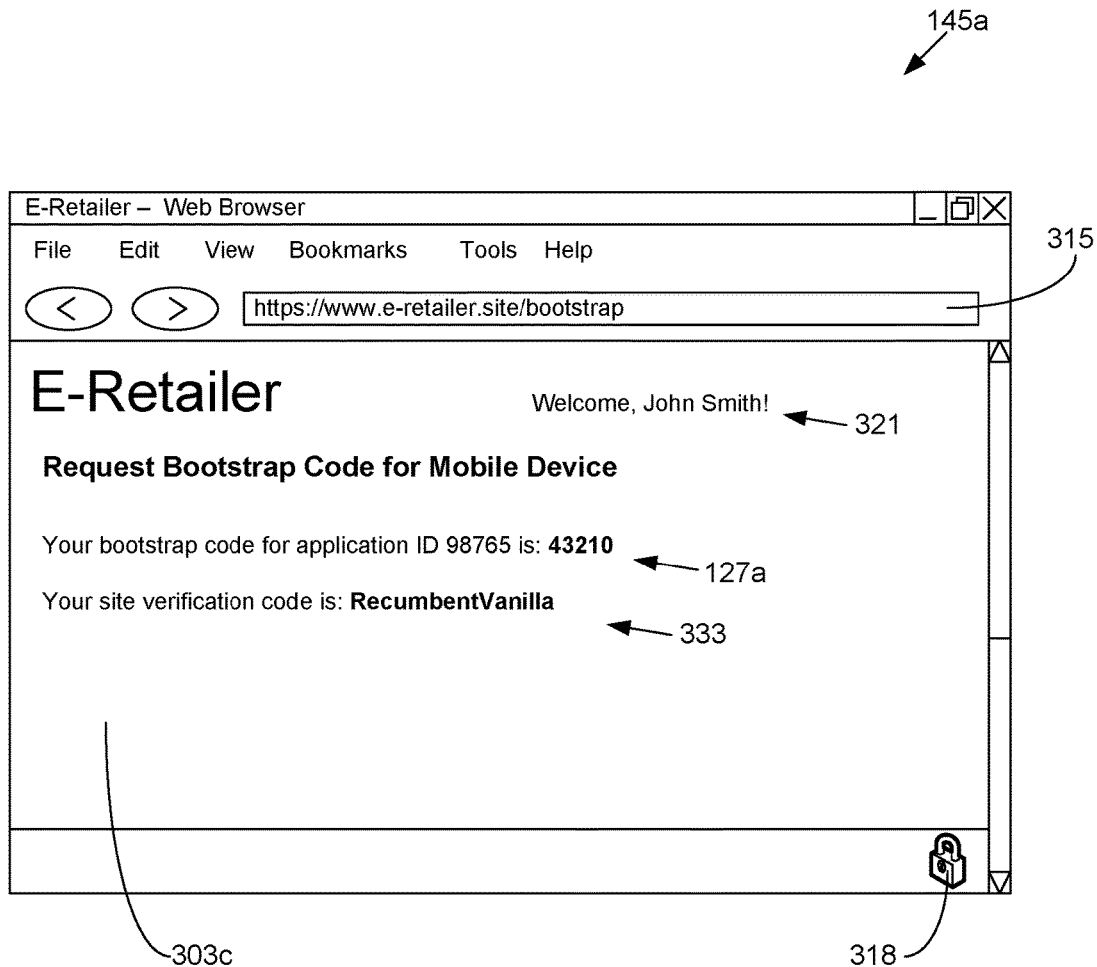

Moving on to FIG. 3C, shown is another example of a user interface 145a rendered by a primary application 110 (FIG. 2) executed in a primary client 106 (FIG. 2) in the networked environment 100 (FIG. 2) according to one embodiment. Specifically, the primary application 110 is a browser that is rendering a network page 303c served up by the computing environment 103 (FIG. 2). The network page 303c facilitates receiving bootstrap security credentials 127 (FIG. 2) from the authentication service 118 (FIG. 2). To this end, the network page 303c presents a bootstrap security credential 127a of "43210," and a site verification credential 333 of "RecumbentVanilla." The user can view the site verification credential 333 to ensure that the network site accessed by the primary client 106 and the bootstrap client 109 (FIG. 2) is the same, in other words, that both show the same site verification credential 333.

Figure 3D:
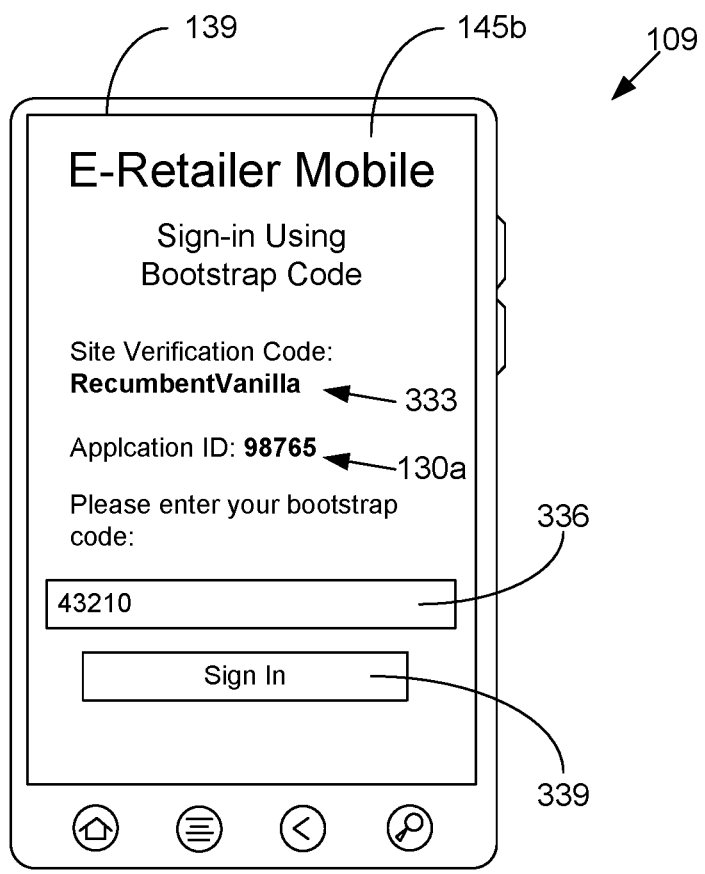
FIG. 3D is a drawing of an example of a user interface rendered by a bootstrap application in the networked environment of FIG. 2 according to various embodiments of the present disclosure.

Continuing to FIG. 3D, shown is one example of a user interface 145b rendered upon a display 139 by a bootstrap application 111 (FIG. 2) executed in a bootstrap client 109 in the networked environment 100 (FIG. 2) according to one embodiment. The user interface 145b allows the user to sign in to the same user account in as the examples of FIGS. 3A-3C through the use of a bootstrap security credential 127 (FIG. 2).

To this end, the user interface 145b includes a bootstrap code field 336 and a submit component 339. In the bootstrap code field 336, the user has entered the bootstrap security credential 127a (FIG. 3C) of "43210." The site verification credential 333 is present to assure the user that the user interface 151a corresponds to the same network site as that accessed in the example of FIG. 3C. The application identifier 130a may be shown in order for the user to populate the application identifier field 327 (FIG. 3B). The application identifier 130a in this example is "98765," which is the same as that entered in the application identifier field 327. The application identifier 130a may be generated by a client application or received from the authentication service 118. Upon entering the bootstrap security credential 127a, the authentication service 118 may authenticate the bootstrap client 109, thereby permitting the bootstrap application 111 and/or other applications in the bootstrap client 109 to access resources associated with the user account.

Figure 3E:
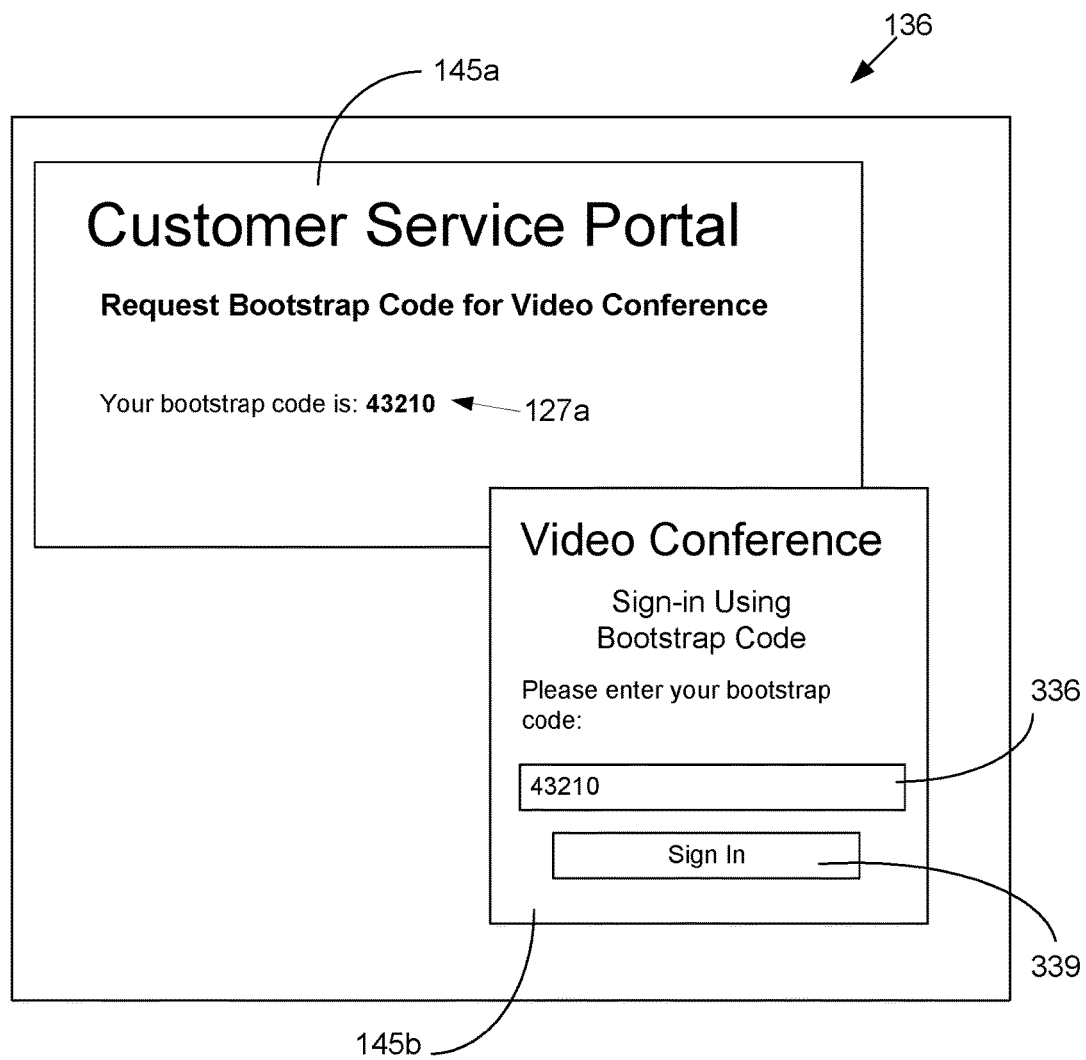
FIGS. 3E and 3F are drawings of examples of displays showing user interfaces rendered by a primary application and a bootstrap application in the networked environment of FIG. 2 according to various embodiments of the present disclosure.

Turning now to FIG. 3E, shown is one example of a display 136 of a primary client 106 (FIG. 2) upon which a user interface 145a is rendered by a primary application 110 (FIG. 2) and upon which a user interface 145b is rendered by a bootstrap application 111 (FIG. 2). Although shown concurrently for purposes of illustration, it is understood that the user interfaces 145a and 145b may be rendered upon the display 136 at different times. Similar to FIG. 3C, the user interface 145a provides a bootstrap security credential 127a to the user. Similar to FIG. 3D, the user interface 145b includes a bootstrap code field 336 for receiving the bootstrap security credential 127 and a submit component 339 for initiating a bootstrap request for the bootstrap application 111.

Figure 3F:
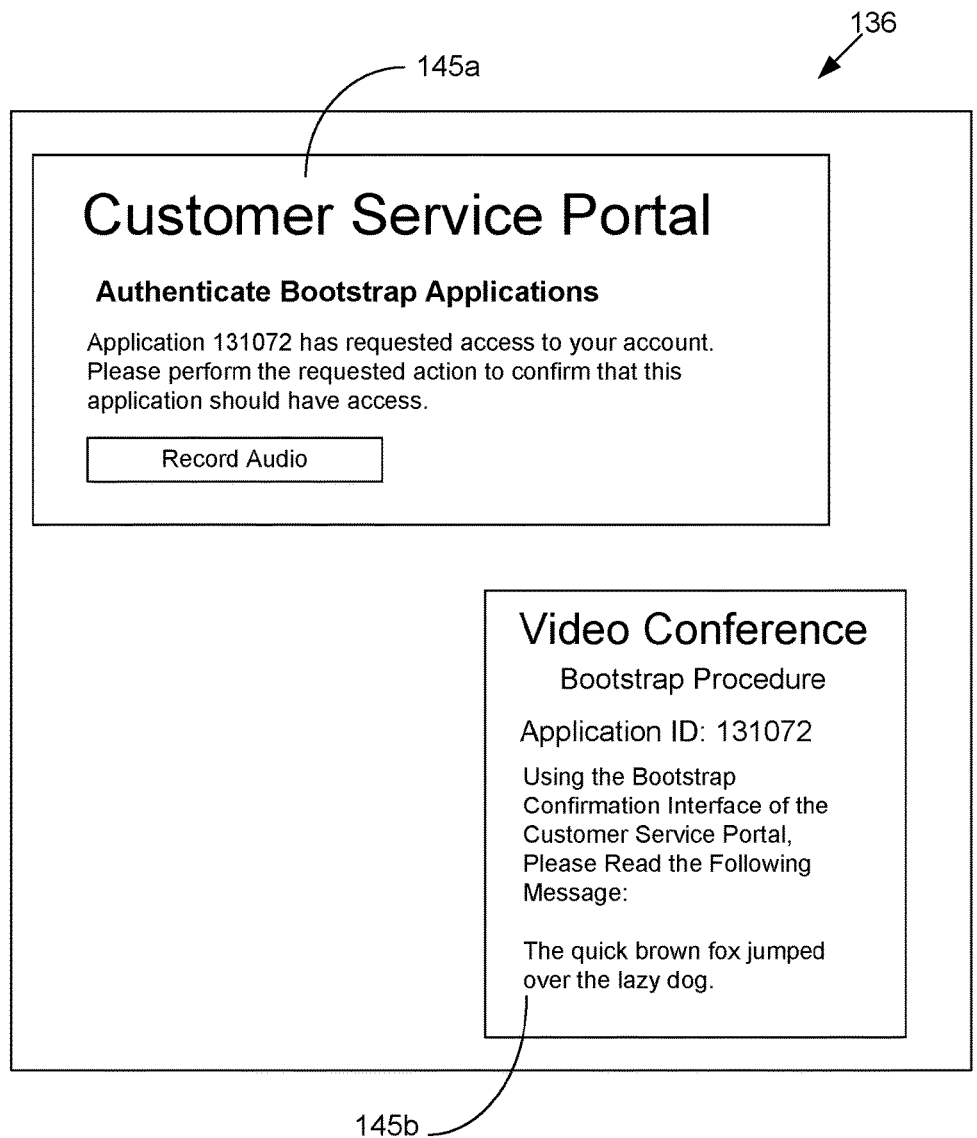

Continuing on to FIG. 3F, shown is one example of a display 136 of a primary client 106 (FIG. 2) upon which a user interface 145a is rendered by a primary application 110 (FIG. 2) and upon which a user interface 145b is rendered by a bootstrap application 111 (FIG. 2). The example of FIG. 3F corresponds to an embodiment where bootstrap authentication is facilitated via a user confirmation through the primary application 110. Although shown concurrently for purposes of illustration, it is understood that the user interfaces 145a and 145b may be rendered upon the display 136 at different times.

In this non-limiting example, the user interface 145b renders a bootstrap confirmation specification that defines one or more user actions to be undertaken by a user via the primary application 110 in order to confirm the bootstrap authentication request. The bootstrap confirmation specification may correspond to a bootstrap security credential 127 (FIG. 2). In this example, the bootstrap confirmation specification instructs the user to dictate a particular message into the primary application 110, which, in some cases, may be executed in a different device than the bootstrap application 111.

The user interface 145a of the primary application 110 indicates the pending bootstrap authentication requests, potentially including an application identifier 130 (FIG. 2) (in this example, "131072") and/or a bootstrap session identifier. The user may then confirm and approve the requests by performing specific actions. In this case, the user interface 145a includes a component ("Record Audio") for initiating audio recording so that the user may dictate the specified message. The primary application 110 may then encode the user action (e.g., the recorded audio) so that it may be sent to the authentication service 118.

The authentication service 118 may then approve the bootstrap authentication request upon a successful confirmation. In other words, the authentication service 118 may compare the result of the user action from the authenticated primary application 110 with the user action expected in order to authenticate the bootstrap application 111. If the user actions match, the bootstrap application 111 is then authenticated.

Confirmations may be provided through a variety of approaches that may involve sensor devices of the primary client 106. For example, voice recognition, face recognition, fingerprint recognition, and/or other forms of biometric identification may be used to indicate approval. Passwords, numerical codes, and/or other security credentials may also be used. Also, the user may be instructed to perform a specific action via the primary application 110, and the specific action may then be verified. For example, the user may be instructed to move the primary client 106 in a certain way, with detection of the movement being done by an accelerometer under control of the primary application 110. The user may be instructed to view a camera of the primary client 106 and to blink a predefined number of times. The user may be instructed to draw a certain gesture upon a touchscreen of the primary client 106. A combination of such approaches may be used in some scenarios.

Figure 4A:
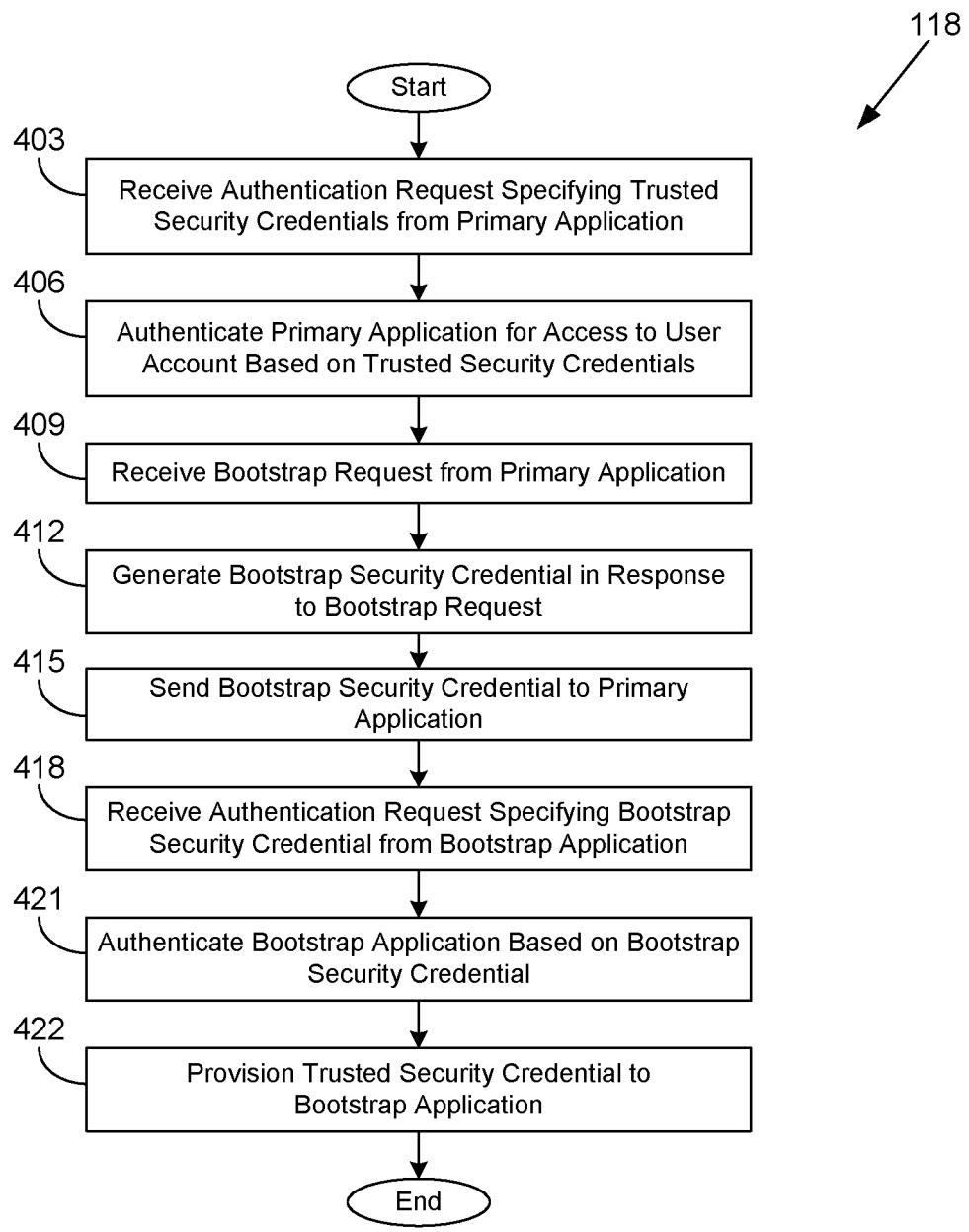
FIG. 4A is a flowchart illustrating one example of functionality implemented as portions of an authentication service executed in a computing environment in the networked environment of FIG. 2 according to various embodiments of the present disclosure.

Referring next to FIG. 4A, shown is a flowchart that provides one example of the operation of a portion of the authentication service 118 according to various embodiments. It is understood that the flowchart of FIG. 4A provides merely an example of the many different types of functional arrangements that may be employed to implement the operation of the portion of the authentication service 118 as described herein. As an alternative, the flowchart of FIG. 4A may be viewed as depicting an example of steps of a method implemented in the computing environment 103 (FIG. 2) according to one or more embodiments.

Beginning with box 403, the authentication service 118 receives an authentication request specifying one or more trusted security credentials 124 (FIG. 2) from a primary application 110 (FIG. 2). In box 406, the authentication service 118 authenticates the primary application 110 for access to a user account or a network session based at least in part on the trusted security credentials 124. For example, the authentication service 118 may calculate a hash value from a password obtained from the primary client 106 and compare the hash value with a stored hash value corresponding to the trusted security credentials 124 to determine whether they match.

In box 409, the authentication service 118 receives a bootstrap request from the primary application 110. In one embodiment, the bootstrap request may specify an application identifier 130 (FIG. 2). In box 412, the authentication service 118 generates a bootstrap security credential 127 (FIG. 2) in response to the bootstrap request. Where the bootstrap request specifies a particular application identifier 130, the bootstrap security credential 127 may be generated based at least in part on the particular application identifier 130, or the bootstrap security credential 127 may be associated with the particular application identifier 130. In box 415, the authentication service 118 sends the bootstrap security credential 127 to the primary application 110. In other embodiments, the bootstrap security credential 127 may be embedded in the primary client 106 (FIG. 2) and may be unlocked or authorized for use by the action of the authentication service 118.

In box 418, the authentication service 118 receives an authentication request that specifies the bootstrap security credential 127 from the bootstrap application 111 (FIG. 2). The authentication request may also include the particular application identifier 130 associated with the bootstrap application 111. In box 421, the authentication service 118 authenticates the bootstrap application 111 based at least in part on the bootstrap security credential 127. Additionally, the authentication service 118 may ensure that an application identifier 130 associated with and/or provided by the bootstrap application 111 corresponds to the particular bootstrap security credential 127 to ensure that the bootstrap security credential 127 is not being used by an unauthorized device or application. In box 422, the authentication service 118 may optionally provision a trusted security credential 124 to the bootstrap application 111 that has been authenticated.

In some cases, two different network data sessions of the primary application 110 and the bootstrap application 111 may be logically tied together as a result of the authentication. In one instance, the session of the primary application 110 may be associated with a system health verification check, e.g., performed by a virtual private network through which the primary application 110 is connected to the network 112. For example, such a check may ensure that the primary client 106 is not compromised by malware or has sufficient resources to perform the functions of the primary application 110 and/or the bootstrap application 111. Accordingly, the session of the bootstrap application 111 may be associated with the same system health verification check. Thereafter, the portion of the authentication service 118 ends.

Figure 4B:
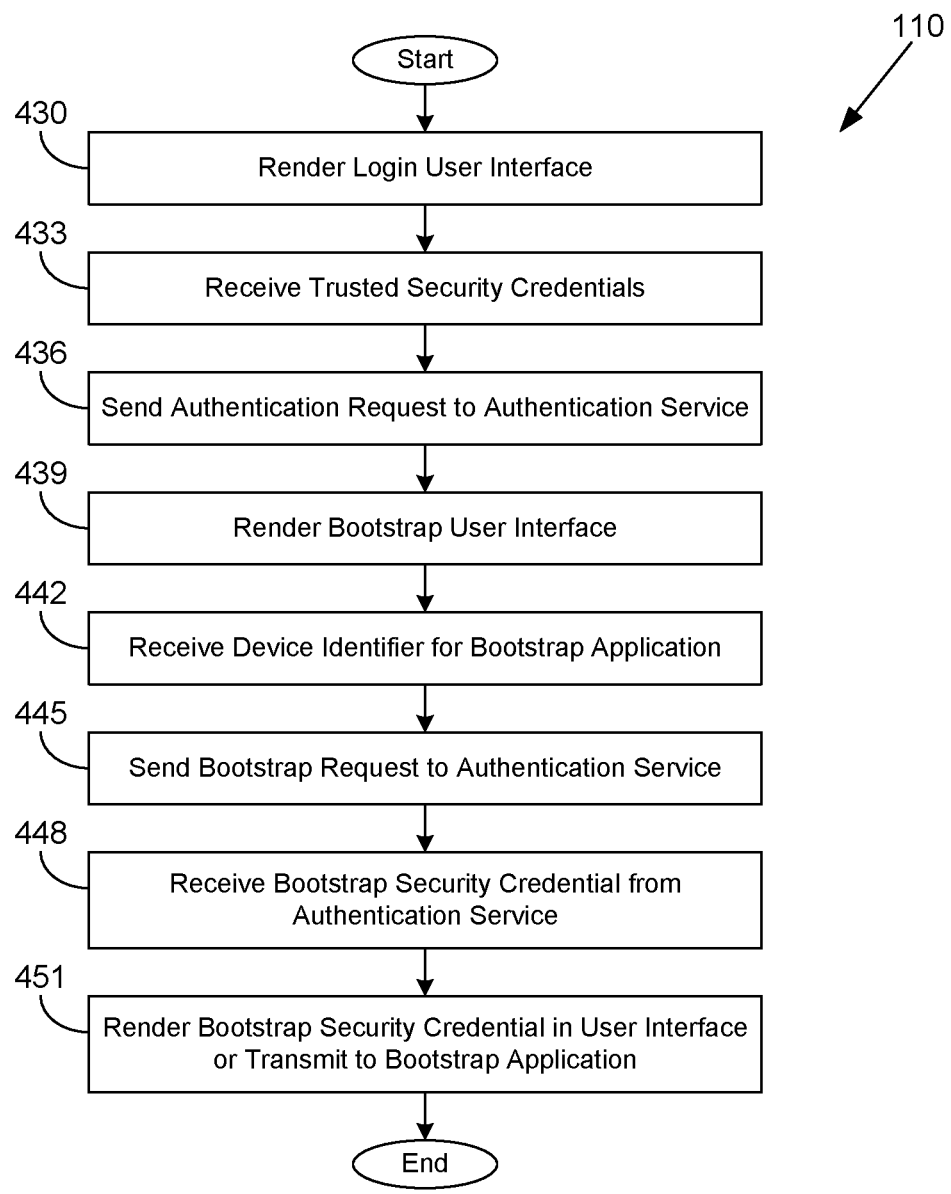
FIG. 4B is a flowchart illustrating one example of functionality implemented as portions of a primary application in the networked environment of FIG. 2 according to various embodiments of the present disclosure.

Turning now to FIG. 4B, shown is a flowchart that provides one example of the operation of a portion of the primary application 110 according to various embodiments. It is understood that the flowchart of FIG. 4B provides merely an example of the many different types of functional arrangements that may be employed to implement the operation of the portion of the primary application 110 as described herein. As an alternative, the flowchart of FIG. 4B may be viewed as depicting an example of steps of a method implemented in the primary client 106 (FIG. 2) according to one or more embodiments.

Beginning with box 430, the primary application 110 renders a login user interface 145 such as that shown in FIG. 3A. In box 433, the primary application 110 receives trusted security credentials 124 (FIG. 2). The trusted security credentials 124 may be input by a user. Alternatively, the trusted security credentials 124 may be stored or embedded in the primary client 106 and loaded automatically by a credential manager. In box 436, the primary application 110 sends the trusted security credentials 124 to the authentication service 118 (FIG. 2) within an authentication request. Subsequently, the authentication service 118 authenticates the primary application 110 for access to resources associated with the user account.

In box 439, the primary application 110 renders a bootstrap user interface 145a (FIG. 2) such as that shown in FIG. 3B. In box 442, the primary application 110 receives an application identifier 130 (FIG. 2) for the bootstrap application 111 (FIG. 2). For example, a user may fill out a form field in the bootstrap user interface 145a, the primary application 110 may capture a quick response (QR) code rendered by the bootstrap application 111, or the primary application 110 may learn of the application identifier 130 by other wireless approaches. In box 445, the primary application 110 sends a bootstrap request to the authentication service 118. The bootstrap request may specify the application identifier 130.

In box 448, the primary application 110 receives a bootstrap security credential 127 from the authentication service 118. In box 451, the primary application 110 renders the bootstrap security credential 127 in a user interface 145a. Alternatively, the primary application 110 may communicate the bootstrap security credential 127 to the bootstrap application 111 via QR code captured with a camera, encoded audio captured with a microphone, wired or wireless data connection, or another approach. In some cases, the primary application 110 may also receive a site verification credential 333 (FIG. 3C) and render this code within the user interface 145*a*. Thereafter, the portion of the primary application 110 ends.

Figure 4C:
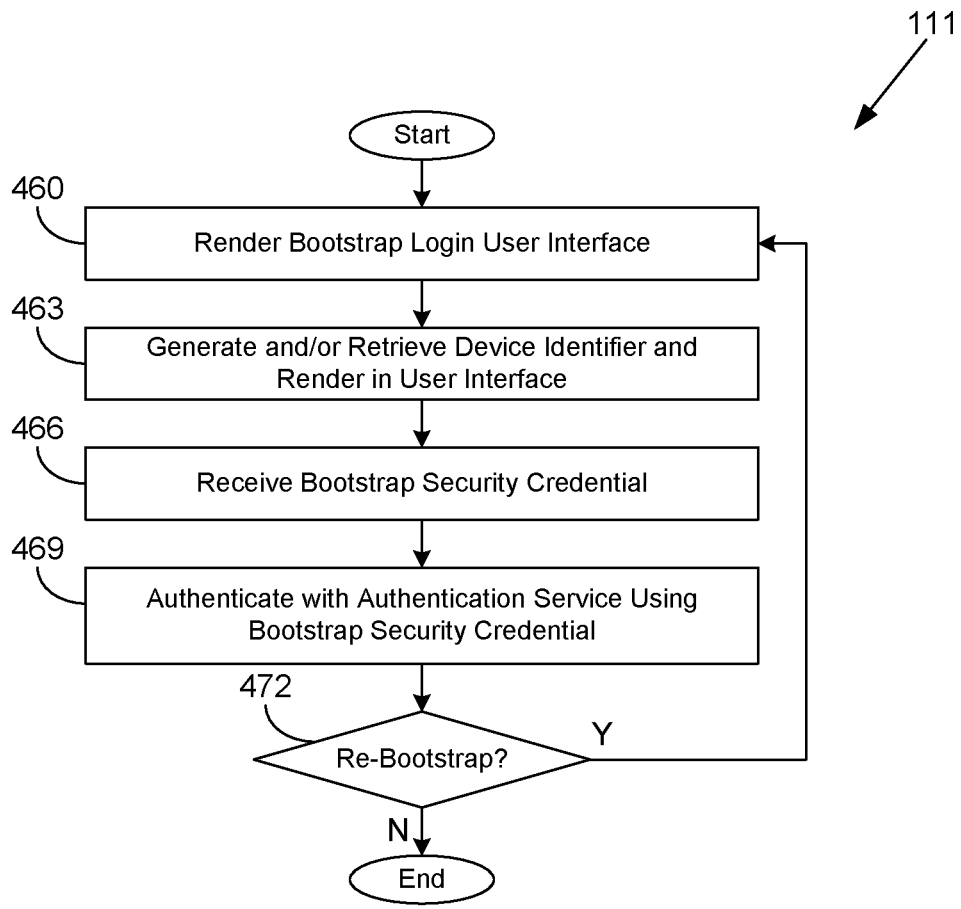
FIG. 4C is a flowchart illustrating one example of functionality implemented as portions of a bootstrap application in the networked environment of FIG. 2 according to various embodiments of the present disclosure.

Moving on to FIG. 4C, shown is a flowchart that provides one example of the operation of a portion of the bootstrap application 111 according to various embodiments. It is understood that the flowchart of FIG. 4C provides merely an example of the many different types of functional arrangements that may be employed to implement the operation of the portion of the bootstrap application 111 as described herein. As an alternative, the flowchart of FIG. 4C may be viewed as depicting an example of steps of a method implemented in the bootstrap client 109 (FIG. 2) or the primary client 106 (FIG. 2) according to one or more embodiments.

Beginning with box 460, the bootstrap application 111 renders a bootstrap login user interface 145*b* (FIG. 2), such as that shown in FIG. 3D. In box 463, the bootstrap application 111 may generate and/or retrieve an application identifier 130 (FIG. 2) and present the application identifier 130 within the user interface 145*b*. In box 466, the bootstrap application 111 receives a bootstrap security credential 127 (FIG. 2). For example, a user may manually fill out a form field with the bootstrap security credential 127 obtained from the primary application 110 (FIG. 2). Alternatively, the bootstrap application 111 may obtain the bootstrap security credential 127 by way of a QR code rendered by the primary client 106 or through a wireless data connection with the primary client 106.

In box 469, the bootstrap application 111 authenticates with the authentication service 118 (FIG. 2) using the bootstrap security credential 127 for access to the user account. The bootstrap application 111 may also present its associated application identifier 130 that uniquely identifies the bootstrap application 111. In box 472, the bootstrap application 111 determines whether re-bootstrapping is needed. In other words, the bootstrap application 111 determines whether it is necessary to authenticate again with the authentication service 118 using a new bootstrap security credential 127. Re-bootstrapping may be called for after a predetermined time period expires or in response to detecting a certain event, such as a change to application code or change in security privileges granted to an application as determined through the application profile data 133 (FIG. 2). If re-bootstrapping is called for, the bootstrap application 111 returns to box 460. Otherwise, the portion of the bootstrap application 111 ends.

Figure 4D:
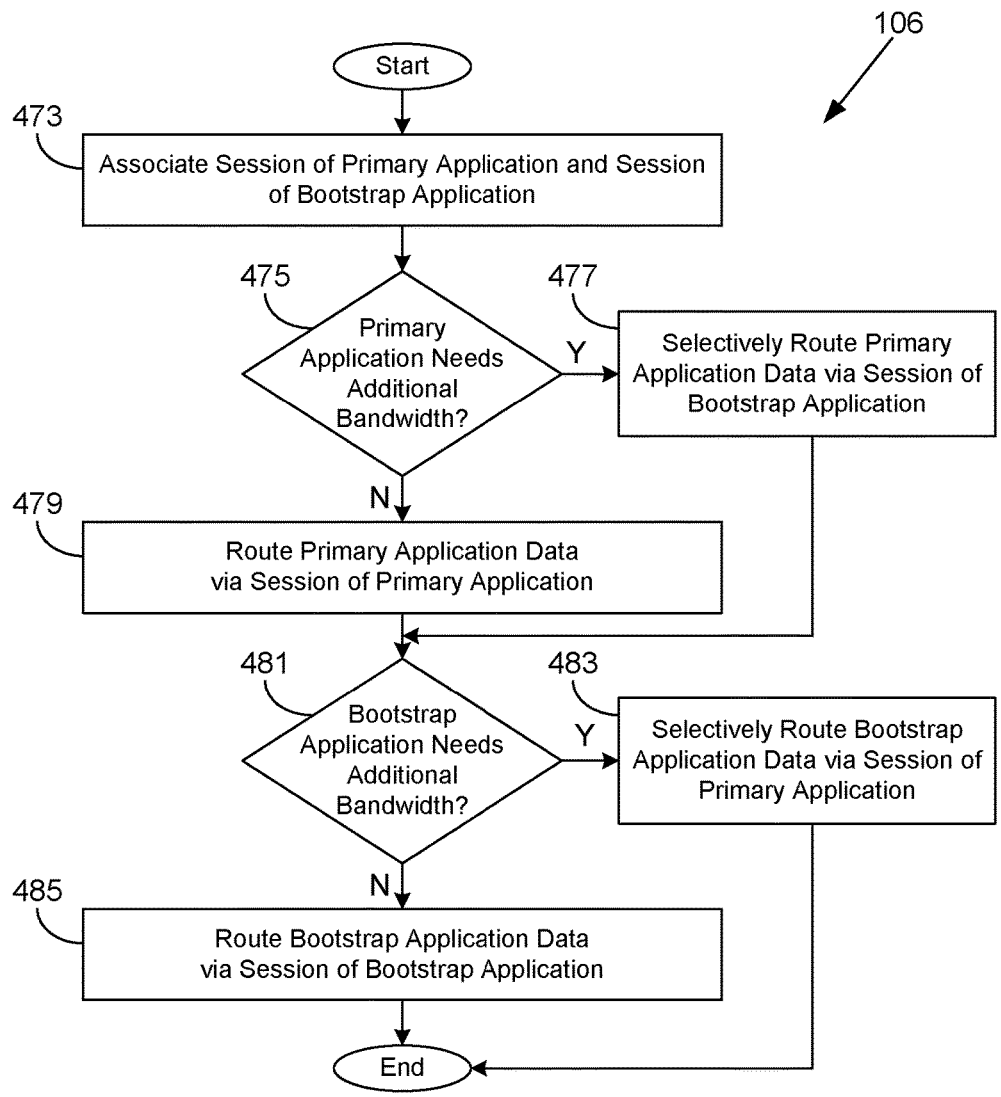
FIG. 4D is a flowchart illustrating one example of functionality implemented as portions of a primary client and/or a bootstrap client in the networked environment of FIG. 2 according to various embodiments of the present disclosure.

Referring next to FIG. 4D, shown is a flowchart that provides one example of the operation of a portion of the primary client 106 and/or the bootstrap client 109 according to various embodiments. It is understood that the flowchart of FIG. 4D provides merely an example of the many different types of functional arrangements that may be employed to implement the operation of the portion of the primary client 106 and/or the bootstrap client 109 as described herein. As an alternative, the flowchart of FIG. 4D may be viewed as depicting an example of elements of a method implemented in the primary client 106 and/or the bootstrap client 109 according to one or more embodiments.

Beginning with box 473, a session of the primary application 110 (FIG. 2) is associated with a session of a bootstrap application 111 (FIG. 2). In box 475, it is determined whether the primary application 110 needs additional bandwidth. For example, the network connection of the primary application 110 may become temporarily unavailable or congested. If the primary application 110 needs additional bandwidth, data of the primary application 110 is selectively routed via the network session of the bootstrap application 111 in box 477. In some cases, if the primary application 110 needs additional bandwidth, the primary application 110 and/or the bootstrap application 111 may be additionally be able to route data via other wireless access points. The selective routing via the network session of the bootstrap application 111 may be facilitated, for example, by way of a local network channel 113 (FIG. 2) between the primary application 110 and the bootstrap application 111. Otherwise, if the primary application 110 does not need additional bandwidth, the data of the primary application 110 is routed via the network session of the primary application 110 in box 479.

In box 481, it is determined whether the bootstrap application 111 needs additional bandwidth. For example, the network connection of the bootstrap application 111 may become temporarily unavailable or congested. If the bootstrap application 111 needs additional bandwidth, data of the bootstrap application 111 is selectively routed via the network session of the primary application 110 in box 483. In some cases, if the bootstrap application 111 needs additional bandwidth, the primary application 110 and/or the bootstrap application 111 may be additionally be able to route data via other wireless access points. The selective routing via the network session of the primary application 110 may be facilitated, for example, by way of a local network channel 113 between the primary application 110 and the bootstrap application 111. Otherwise, if the bootstrap application 111 does not need additional bandwidth, the data of the bootstrap application 111 is routed via the network session of the bootstrap application 111 in box 485. Thereafter, the flowchart of FIG. 4D ends.

Figure 5A:
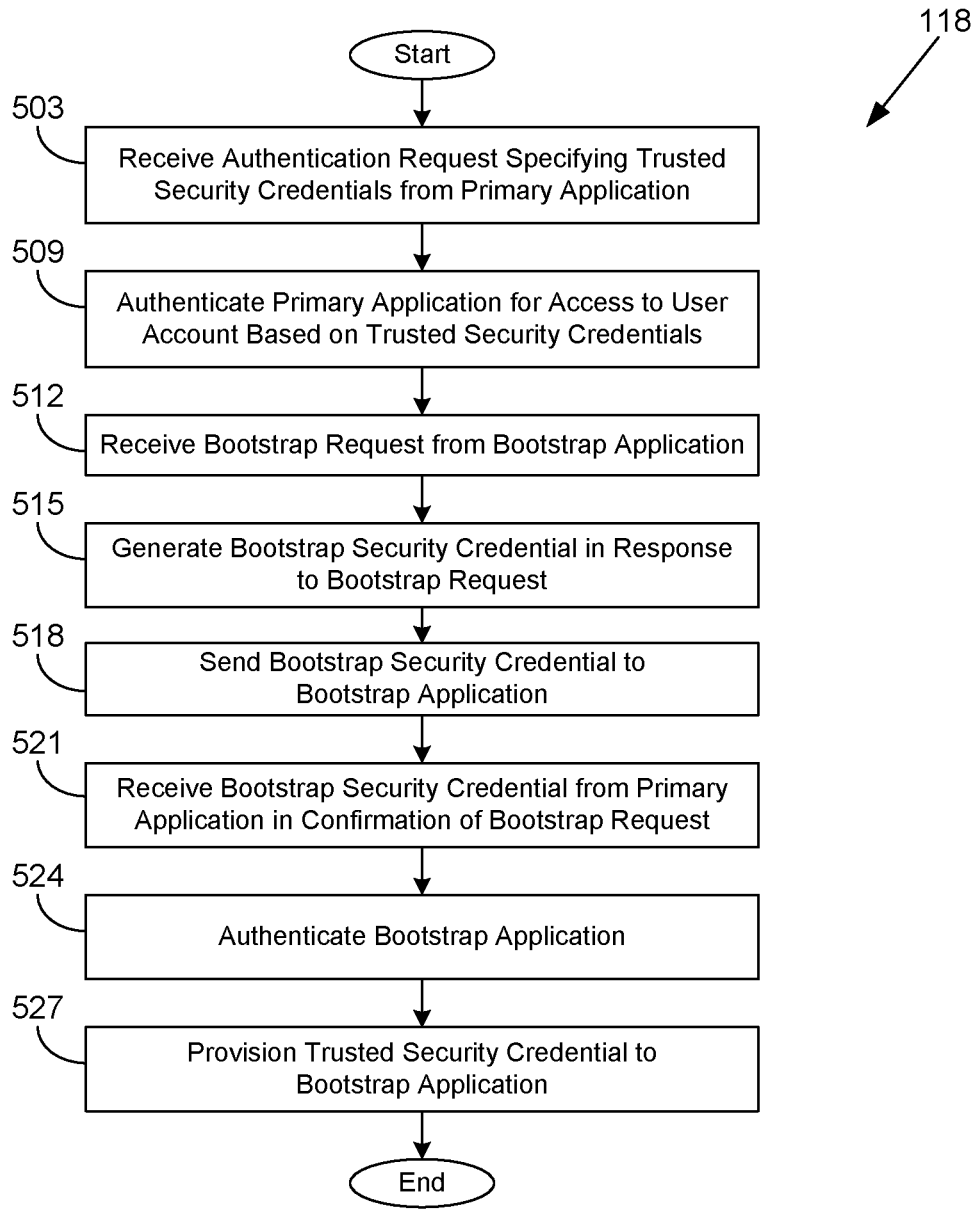
FIG. 5A is a flowchart illustrating one example of functionality implemented as portions of an authentication service executed in a computing environment in the networked environment of FIG. 2 according to various embodiments of the present disclosure.

Referring next to FIG. 5A, shown is a flowchart that provides one example of the operation of a portion of the authentication service 118 according to various embodiments that provide for confirmation of bootstrap authentication by the primary application 110 (FIG. 2). It is understood that the flowchart of FIG. 5A provides merely an example of the many different types of functional arrangements that may be employed to implement the operation of the portion of the authentication service 118 as described herein. As an alternative, the flowchart of FIG. 5A may be viewed as depicting an example of steps of a method implemented in the computing environment 103 (FIG. 2) according to one or more embodiments.

Beginning with box 503, the authentication service 118 receives an authentication request specifying one or more trusted security credentials 124 (FIG. 2) from a primary application 110. The authentication request may specify an identifier of a user account. In box 509, the authentication service 118 authenticates the primary application 110 for access to a user account or a network session based at least in part on the trusted security credentials 124. For example, the authentication service 118 may calculate a hash value from a password obtained from the primary client 106 and compare the hash value with a stored hash value corresponding to the trusted security credentials 124 to determine whether they match.

In box 512, the authentication service 118 receives a bootstrap request from the bootstrap application 111. In one embodiment, the bootstrap request may specify an application identifier 130 (FIG. 2). The bootstrap request may also specify an identifier of the user account. In box 515, the authentication service 118 generates a bootstrap security credential 127 (FIG. 2) in response to the bootstrap request. Where the bootstrap request specifies a particular application identifier 130, the bootstrap security credential 127 may be generated based at least in part on the particular application identifier 130, or the bootstrap security credential 127 may be associated with the particular application identifier 130.

In box 518, the authentication service 118 sends the bootstrap security credential 127 to the bootstrap application 111. In other embodiments, the bootstrap security credential 127 may be embedded in the bootstrap client 109 (FIG. 2) and may be unlocked or authorized for use by the action of the authentication service 118. Although the bootstrap security credential 127 is described as being generated by the authentication service 118, in other embodiments, the bootstrap security credential 127 is user specified via a user interface 145b (FIG. 2) of the bootstrap application 111 and then sent to the authentication service 118.

In box 518, the authentication service 118 sends the bootstrap security credential 127 to the bootstrap application 111. In one embodiment, the bootstrap security credential 127 may comprise a numerical code, a password, and/or another form of security credential that the user may enter via the primary application 110. In another embodiment, the bootstrap security credential 127 may comprise a bootstrap confirmation specification that defines one or more user actions to be performed via the primary application 110 while the primary application 110 is authenticated.

In box 521, the authentication service 118 receives the bootstrap security credential 127 from the primary application 110 in a confirmation of the bootstrap request. As a first example, the user may enter a password or numerical code in a text entry field in a user interface 145a (FIG. 2) of the primary application 110. In other examples, the user may perform one or more predefined user actions in order to confirm the bootstrap request. Such user actions may involve one or more sensor devices of the primary client 106, including but not limited to accelerometers, touchscreens, sound devices, camera devices, and so on. The authentication service 118 may cause a particular user interface 145a to be rendered by the primary client 106 to facilitate entry of the bootstrap security credential 127. Alternatively, the user may cause such a user interface 145a to be rendered.

In box 524, the authentication service 118 authenticates the bootstrap application 111 in response to the confirmation being valid. In box 527, the authentication service 118 may optionally provision a trusted security credential 124 to the bootstrap application 111 that has been authenticated. Alternatively, the application identifier 130 of the bootstrap application 111 and/or another session identifier may be employed as an authenticated session identifier by the bootstrap application 111. Thereafter, the portion of the authentication service 118 ends.

Figure 5B:
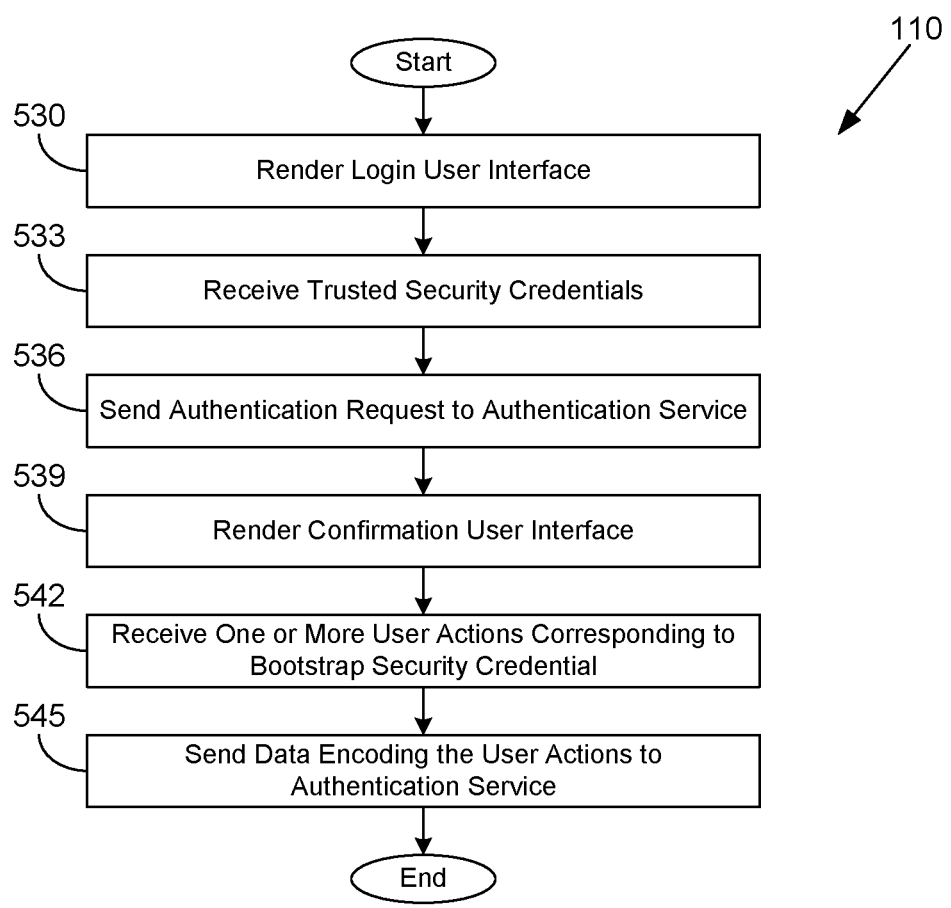
FIG. 5B is a flowchart illustrating one example of functionality implemented as portions of a primary application in the networked environment of FIG. 2 according to various embodiments of the present disclosure.

Turning now to FIG. 5B, shown is a flowchart that provides one example of the operation of a portion of the primary application 110 according to various embodiments that provide for confirmation by the primary application 110 of bootstrap requests. It is understood that the flowchart of FIG. 5B provides merely an example of the many different types of functional arrangements that may be employed to implement the operation of the portion of the primary application 110 as described herein. As an alternative, the flowchart of FIG. 5B may be viewed as depicting an example of steps of a method implemented in the primary client 106 (FIG. 2) according to one or more embodiments.

Beginning with box 530, the primary application 110 renders a login user interface 145 such as that shown in FIG. 3A. In box 533, the primary application 110 receives trusted security credentials 124 (FIG. 2). The trusted security credentials 124 may be input by a user. Alternatively, the trusted security credentials 124 may be stored or embedded in the primary client 106 and loaded automatically by a credential manager. In box 536, the primary application 110 sends the trusted security credentials 124 to the authentication service 118 (FIG. 2) within an authentication request. Subsequently, the authentication service 118 authenticates the primary application 110 for access to resources associated with the user account.

In box 539, the primary application 110 renders a confirmation user interface 145a (FIG. 2) such as that shown in FIG. 3F. The confirmation user interface 145a may be rendered in response to a directive by the authentication service 118 or in response to a user command. The confirmation user interface 145 may show the application identifier 130 (FIG. 2) associated with the bootstrap application 111 and/or other identifying information pertaining to the bootstrap authentication request.

In box 542, the primary application 110 receives one or more user actions corresponding to a bootstrap security credential 127 (FIG. 2) in order to confirm a bootstrap request by a bootstrap application 111 (FIG. 2). Such user actions may include receiving text entry of a password, a dictation of at least one word captured by a sound recording device, a touch gesture captured by a touchscreen (e.g., a finger swipe in a particular direction), specific image content captured by a camera (e.g., a user blinking a certain number of times), and so on. In box 545, the primary application 110 sends data encoding the user actions to the authentication service 118 in order to confirm the bootstrap request. Alternatively, the user may reject the bootstrap request and provide an explicit rejection and/or fail to provide a confirmation. Thereafter, the portion of the primary application 110 ends.

Figure 5C:
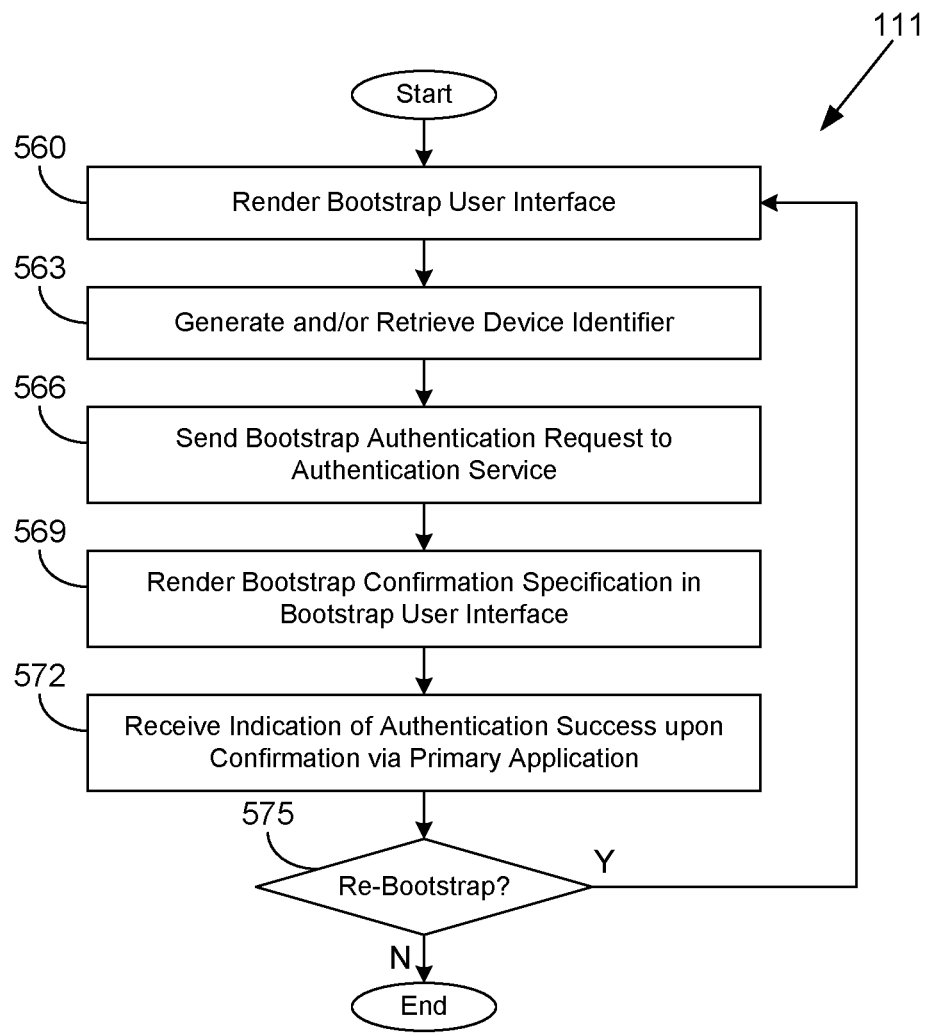
FIG. 5C is a flowchart illustrating one example of functionality implemented as portions of a bootstrap application in the networked environment of FIG. 2 according to various embodiments of the present disclosure.

Moving on to FIG. 5C, shown is a flowchart that provides one example of the operation of a portion of the bootstrap application 111 according to various embodiments that provide for confirmation of bootstrap authentication via a primary application 110 (FIG. 2). It is understood that the flowchart of FIG. 5C provides merely an example of the many different types of functional arrangements that may be employed to implement the operation of the portion of the bootstrap application 111 as described herein. As an alternative, the flowchart of FIG. 5C may be viewed as depicting an example of steps of a method implemented in the bootstrap client 109 (FIG. 2) or the primary client 106 (FIG. 2) according to one or more embodiments.

Beginning with box 560, the bootstrap application 111 renders a bootstrap login user interface 145b (FIG. 2), such as that shown in FIG. 3F. In box 563, the bootstrap application 111 may generate and/or retrieve an application identifier 130 (FIG. 2). In box 566, automatically or in response to a user request, the bootstrap application 111 submits a bootstrap authentication request to the authentication service 118 (FIG. 2). The bootstrap authentication request may specify the application identifier 130 (FIG. 2) corresponding to the instance of the bootstrap application 111. In some cases, the bootstrap authentication request may specify, or be associated with, a bootstrap session identifier. In box 569, the bootstrap application 111 renders a bootstrap confirmation specification in the bootstrap login user interface 145b. The bootstrap confirmation specification may correspond to a bootstrap security credential 127, which may be generated by the authentication service 118 and sent to the bootstrap application 111, or which may be specified by the user via the bootstrap application 111.

In box 572, the bootstrap application 111 receives an indication of authentication success from the authentication service 118 upon the authentication service 118 receiving a confirmation of the bootstrap request via the primary application 110. Alternatively, upon failure to receive a confirmation or in response to an explicit rejection, bootstrap authentication may be denied. In another embodiment, bootstrap authentication may succeed unless a user action to prevent authentication is undertaken via the primary application 110.

In box 575, the bootstrap application 111 determines whether re-bootstrapping or subsequent confirmation is needed. Re-bootstrapping may be called for after a predetermined time period expires or in response to detecting a certain event, such as a change to application code or change in security privileges granted to an application as determined through the application profile data 133 (FIG. 2). If re-bootstrapping is called for, the bootstrap application 111 returns to box 560. Otherwise, the portion of the bootstrap application 111 ends.

Figure 6:
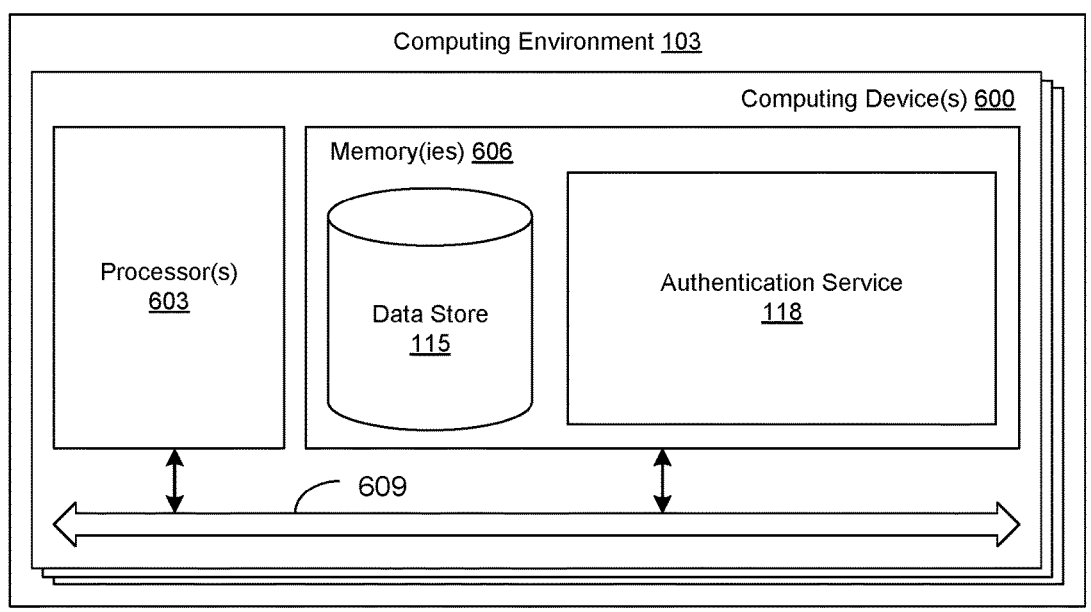
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the authentication service 118 and potentially other applications. Also stored in the memory 606 may be a data store 115 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the authentication service 118, the primary application 110 (FIG. 2), the bootstrap application 111 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4A-5C show the functionality and operation of an implementation of portions of the authentication service 118, the primary application 110, and/or the bootstrap application 111. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4A-5C show a specific order of execution, it is understood that the order of execution may differ from that which is depicted. For example, the order of execution of two or more blocks may be scrambled relative to the order shown. Also, two or more blocks shown in succession in FIGS. 4A-5C may be executed concurrently or with partial concurrence. Further, in some embodiments, one or more of the blocks shown in FIGS. 4A-5C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 118, the primary application 110, and the bootstrap application 111, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 118, the primary application 110, and the bootstrap application 111, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure can be described in view of the following clauses:

Clause 1. A non-transitory computer-readable medium embodying a program executable in at least one computing device, comprising: code that authenticates a first application executed in a primary client device for access to a session based at least in part on a first security credential received from the primary client device via the first application in a first authentication request; code that generates a second security credential for the session based at least in part on an application identifier provided via the first application that has been authenticated, wherein, in response to receiving the second security credential, the at least one computing device is configured to authenticate a second application executed in a bootstrap client device for access to the session, the application identifier uniquely identifying at least one of the second application or the bootstrap client device; code that sends the second security credential to the first application that has been authenticated; code that authenticates the second application for access to the session based at least in part on the second security credential and the application identifier being received from the bootstrap client device via the second application in a second authentication request; and wherein the second application is configured to facilitate data entry for the first application by way of the bootstrap client device, the first application is configured to facilitate data entry for the second application by way of the primary client device, or both.

Clause 2. The non-transitory computer-readable medium of clause 1, wherein the primary client device is a digital television or a set-top box, and the bootstrap client device comprises a mobile computing device.

Clause 3. The non-transitory computer-readable medium of clauses 1 to 2, wherein upon authentication of the bootstrap client device, the first application is configured to selectively route network data via a first network coupled to the primary client device or a second network coupled to the bootstrap client device, wherein the primary client device and the bootstrap client device are connected via a local network channel.

Clause 4. A system, comprising: at least one first computing device; and an authentication service executed in the at least one first computing device, the authentication service comprising: logic that authenticates a first application executed in at least one second computing device for access to a user account based at least in part on a first security credential received from the at least one second computing device via the first application in a first authentication request; logic that, in response to receiving an application identifier from the at least one second computing device, generates a second security credential for the user account based at least in part on the application identifier, wherein, in response to receiving both the second security credential and the application identifier, the at least one first computing device is configured to authenticate a second application executed in the at least one second computing device for access to the user account; logic that sends the second security credential to the first application that has been authenticated; and logic that authenticates the second application for access to the user account based at least in part on the second security credential and the application identifier being received from the at least one second computing device via the second application in a second authentication request.

Clause 5. The system of clause 4, wherein the application identifier uniquely identifies the second application.

Clause 6. The system of clauses 4 to 5, wherein the authentication service further comprises: logic that generates a user interface configured to present the second security credential to a user; and logic that sends data encoding the user interface to the at least one second computing device.

Clause 7. The system of clauses 4 to 6, wherein the second authentication request excludes the first security credential.

Clause 8. The system of clauses 4 to 7, wherein the first security credential comprises a trusted security credential, the second security credential comprises a bootstrap security credential, and the second security credential is sent to the at least one second computing device in response to a bootstrap request.

Clause 9. The system of clauses 4 to 8, wherein the at least one second computing device comprises a single second computing device, and both the first application and the second application are executed in the single second computing device.

Clause 10. The system of clauses 4 to 9, wherein the at least one second computing device comprises a plurality of second computing devices, the first application is executed in a first one of the plurality of second computing devices, and the second application is executed in a second one of the plurality of second computing devices.

Clause 11. The system of clauses 4 to 10, wherein the authentication service further comprises logic that associates a first network session of the first application with a second network session of the second application in response to authenticating the second application for access to the user account.

Clause 12. The system of clause 11, wherein upon the second application being authenticated for access to the user account, the at least one second computing device is configured to selectively route network data traffic of the first application via the second network session, selectively route network data traffic of the second application via the first network session, or both.

Clause 13. The system of clause 11, wherein the first network session is associated with a system health verification performed upon the at least one second computing device, and upon associating the first network session with the second network session, the second network session becomes associated with the system health verification.

Clause 14. A method, comprising: receiving, via at least one of one or more first computing devices, a first security credential for a user account from a user; authenticating, via at least one of the one or more first computing devices, a first application with a second computing device using the first security credential; sending, via at least one of the one or more first computing devices after authenticating, a bootstrap request to the second computing device for a second security credential to authenticate a second application without using the first security credential, the bootstrap request specifying a bootstrap session identifier; and receiving, via at least one of the one or more first computing devices, the second security credential from the second computing device.

Clause 15. The method of clause 14, further comprising authenticating, via at least one of the one or more first computing devices, the second application with the second computing device using the second security credential and the bootstrap session identifier.

Clause 16. The method of clause 15, further comprising selectively routing, via at least one of the one or more first computing devices, data via a first network session associated with the first application, a second network session associated with the second application, or both after the first application and the second application have been authenticated.

Clause 17. The method of clauses 14 to 16, further comprising authenticating, via at least one of the one or more first computing devices, a third application with the second computing device using the second security credential and the bootstrap session identifier.

Clause 18. The method of clauses 14 to 17, further comprising receiving, via at least one of the one or more first computing devices, data entered by the user via a third computing device that has been authenticated by way of the second security credential.

Clause 19. The method of clauses 14 to 18, further comprising sending, via at least one of the one or more first computing devices, the second security credential to a third computing device via a wireless data connection.

Clause 20. The method of clauses 14 to 19, further comprising causing, via at least one of the one or more first computing devices, the second security credential to be rendered upon a display.

Clause 21. A non-transitory computer-readable medium embodying a program executable in at least one first computing device, comprising: code that authenticates a first application executed in a second computing device for access to a user account based at least in part on a trusted security credential received from the second computing device via the first application in a first authentication request; code that, in response to receiving a second authentication request from a third computing device via a second application, generates a bootstrap confirmation specification for the user account, the bootstrap confirmation specification defining at least one user action to be performed via the first application that has been authenticated in order to confirm authentication of the second application, the second authentication request excluding the trusted security credential; code that sends the bootstrap confirmation specification to the second application that is pending authentication; and code that authenticates the second application for access to the user account based at least in part on the at least one user action being performed via the first application in a confirmation of the second authentication request.

Clause 22. The non-transitory computer-readable medium of clause 21, further comprising code that associates the bootstrap confirmation specification with an application identifier of the second application.

Clause 23. The non-transitory computer-readable medium of clauses 21 to 22, wherein the at least one user action includes at least one of: a dictation of at least one word, at least one motion applied to the second computing device, a touch gesture captured by the second computing device, or a specific image content captured by the second computing device.

Clause 24. The non-transitory computer-readable medium of clauses 21 to 23, further comprising code that generates a user interface configured to detect a user performance of the at least one user action via the second computing device.

Clause 25. The non-transitory computer-readable medium of clauses 21 to 24, further comprising code that generates a user interface for rendering via the second application, the user interface being configured to instruct a user to perform the at least one user action via the first application that has been authenticated in order to provide the confirmation.

Clause 26. A system, comprising: at least one first computing device; and an authentication service executed in the at least one first computing device, the authentication service comprising: logic that authenticates a first application executed in at least one second computing device for access to a user account based at least in part on a first security credential received from the at least one second computing device via the first application in a first authentication request; logic that, in response to receiving a second authentication request from the at least one second computing device via a second application, generates a second security credential for the user account; logic that sends the second security credential to the second application that is pending authentication; and logic that authenticates the second application for access to the user account based at least in part on the second security credential being received from the at least one second computing device via the first application in a confirmation of the second authentication request.

Clause 27. The system of clause 26, wherein the second security credential corresponds to at least one user action to be performed via at least one sensor device controlled by the first application.

Clause 28. The system of clauses 26 to 27, wherein the authentication service further comprises logic that terminates an authentication session of the second application in response to receiving a logout request from the first application.

Clause 29. The system of clauses 26 to 28, wherein both the first authentication request and the second authentication request specify an identifier of the user account.

Clause 30. The system of clauses 26 to 29, wherein the second authentication request specifies an identifier of the second application, and the second security credential is generated based at least in part on the identifier of the second application.

Clause 31. The system of clauses 26 to 30, wherein the authentication service further comprises logic that requests the confirmation of the second authentication request from the first application that has been authenticated.

Clause 32. The system of clauses 26 to 32, wherein the at least one second computing device comprises a single second computing device, and both the first application and the second application are executed in the single second computing device.

Clause 33. The system of clauses 26 to 32, wherein the at least one second computing device comprises a plurality of second computing devices, the first application is executed in a first one of the plurality of second computing devices, and the second application is executed in a second one of the plurality of second computing devices.

Clause 34. A method, comprising: receiving, via at least one of one or more first computing devices, a security credential for a user account from a user; authenticating, via at least one of the one or more first computing devices, a first application with an authentication service using the security credential; receiving, via at least one of the one or more first computing devices, at least one user action in a confirmation of a bootstrap authentication request submitted by a second application to the authentication service, the confirmation being received via the first application while the first application is authenticated; and sending, via at least one of the one or more first computing devices, data encoding the at least one user action to the authentication service.

Clause 35. The method of clause 34, further comprising causing, via at least one of the one or more first computing devices, a user interface to be rendered, the user interface facilitating a user performance of the at least one user action.

Clause 36. The method of clauses 34 to 35, wherein the user interface includes an application identifier associated with the second application.

Clause 37. The method of clauses 34 to 36, wherein the first application facilitates data entry for the second application.

Clause 38. The method of clauses 34 to 37, wherein receiving the at least one user action further comprises at least one of: receiving a sound via a microphone; receiving an image via a camera; receiving a gesture via a touchscreen; or receiving a motion via an accelerometer.

Clause 39. The method of clauses 34 to 38, further comprising: receiving, via at least one of the one or more first computing devices, a user request to terminate an authentication session of the second application after the second application has been authenticated in response to the bootstrap authentication request; and sending, via at least one of the one or more first computing devices, data encoding the user request to terminate the authentication session of the second application to the authentication service.

Clause 40. The method of clauses 34 to 39, further comprising: receiving, via at least one of the one or more first computing devices, a subsequent at least one user action in a subsequent confirmation of another bootstrap authentication request submitted by a third application to the authentication service, the subsequent confirmation being received via the first application while the first application is authenticated; and sending, via at least one of the one or more first computing devices, data encoding the subsequent at least one user action to the authentication service.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one first computing device, causes the at least one first computing device to at least:
   authenticate a first application executed in a second computing device based at least in part on a first security credential received from the second computing device via the first application in a first authentication request;
   in response to receiving a second authentication request from a second application executed in a third computing device, generate a second security credential for a user account;
   authenticate the second application for access to the user account based at least in part on receiving the second security credential from the first application;
   subsequent to authenticating the second application for access to the user account, receive data encoding a text input from the first application;
   update session data based at least in part on receiving the data encoding the text input; and
   send the text input to the third computing device and into a text entry field of the second application executed in the third computing device.

2. The non-transitory computer-readable medium of claim 1, wherein the program further causes the at least one first computing device to at least provision the second security credential to the second application.

3. The non-transitory computer-readable medium of claim 1, wherein the program further causes the at least one first computing device to at least:
generate a user interface configured to detect a user performance of at least one user action via the second computing device; and
receive data encoding the at least one user action from the first application.

4. The non-transitory computer-readable medium of claim 3, wherein the second application is authenticated based further in part on receiving the data encoding the at least one user action.

5. The non-transitory computer-readable medium of claim 1, wherein the program further causes the at least one first computing device to at least:
receive data encoding a second text input from the first application; and
send the second text input to the second application.

6. The non-transitory computer-readable medium of claim 1, wherein the program further causes the at least one first computing device to at least update state information in session data based at least in part on the text input.

7. A system, comprising:
a data store storing authentication data; and
at least one first computing device communicably coupled to the data store, the at least one first computing device configured to at least:
authenticate a first application executed in a second computing device based at least in part on a first security credential received from the first application in a first authentication request;
generate a user interface configured to detect a user performance of at least one user action via the second computing device;
receive data encoding the at least one user action from the first application;
authenticate a second application for access to a user account based at least in part on receiving the data encoding the at least one user action;
subsequent to authenticating the second application for access to the user account, receive data encoding a text input from the first application; and
send the text input to a third computing device and into a text entry field of the second application executed in the third computing device.

8. The system of claim 7, wherein the at least one first computing device is further configured to at least generate a second security credential for the user account in response to receiving a second authentication request from the second application executed in the third computing device.

9. The system of claim 7, wherein the at least one first computing device is further configured to associate a first data session corresponding to the first application with a second data session corresponding to the second application.

10. The system of claim 9, wherein the first data session is associated with a system health verification performed upon the second computing device.

11. The system of claim 10, wherein in response to associating the first data session with the second data session, the second data session becomes associated with the system health verification.

12. The system of claim 10, wherein the user interface is generated in response to receiving a bootstrap request from the first application.

13. A method, comprising:
receiving, via at least one of one or more first computing devices, a security credential for a user account from a user;
authenticating, via at least one of the one or more first computing devices, a first application executed in a second computing device with an authentication service using the security credential;
receiving, via at least one of the one or more first computing devices, at least one user action in a confirmation of a bootstrap authentication request submitted by a second application to the authentication service, the confirmation being received via the first application while the first application is authenticated, wherein receiving the at least one user action comprising at least one of receiving a sound via a microphone, receiving a gesture via a touchscreen, or receiving a motion via an accelerometer;
sending, via at least one of the one or more first computing devices, data encoding the at least one user action to the authentication service;
subsequent to authenticating the second application based at least in part on the at least one user action, receiving, via at least one of the one or more first computing devices, a text input from the user; and
sending, via at least one of the one or more first computing devices, the text input to a third computing device and into a text entry field of the second application executed in the third computing device.

14. The method of claim 13, further comprising causing, via at least one of the one or more first computing devices, a user interface to be rendered, the user interface facilitating a user performance of the at least one user action.

15. The method of claim 13, wherein the first application facilitates data entry for the second application.

16. The method of claim 13, further comprising:
receiving, via at least one of the one or more first computing devices, a user request to terminate an authentication session of the second application after the second application has been authenticated in response to the bootstrap authentication request; and
sending, via at least one of the one or more first computing devices, data encoding the user request to terminate the authentication session of the second application to the authentication service.

17. The method of claim 13, further comprising:
receiving, via at least one of the one or more first computing devices, a subsequent at least one user action in a subsequent confirmation of another bootstrap authentication request submitted by a third application to the authentication service, the subsequent confirmation being received via the first application while the first application is authenticated; and
sending, via at least one of the one or more first computing devices, data encoding the subsequent at least one user action to the authentication service.

18. The method of claim 13, further comprising receiving, via at least one of the one or more first computing devices, a bootstrap confirmation specification for the user account from the second application via a wireless network, the bootstrap confirmation specification defining the at least one user action to be performed via the first application in order to confirm authentication of the second application.

19. The method of claim 18, further comprising causing, via at least one of the one or more first computing devices, a user interface to be rendered via the first application, the user interface including instructions to perform the at least one user action based at least in part on the bootstrap confirmation specification received from the second application via the wireless network.

20. The method of claim 13, wherein the text input is sent to the second application via the authentication service.

* * * * *